United States Patent
Hatakeyama et al.

(10) Patent No.: US 9,800,077 B2
(45) Date of Patent: Oct. 24, 2017

(54) DC POWER-SUPPLY DEVICE AND REFRIGERATION-CYCLE APPLICATION DEVICE INCLUDING THE SAME

(71) Applicant: Mitsubishi Electric Corporation, Tokyo (JP)

(72) Inventors: Kazunori Hatakeyama, Tokyo (JP); Keisuke Uemura, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/024,393

(22) PCT Filed: Nov. 26, 2013

(86) PCT No.: PCT/JP2013/081819
§ 371 (c)(1),
(2) Date: Mar. 24, 2016

(87) PCT Pub. No.: WO2015/079504
PCT Pub. Date: Jun. 4, 2015

(65) Prior Publication Data
US 2016/0241073 A1  Aug. 18, 2016

(51) Int. Cl.
*G05F 1/70* (2006.01)
*H02J 7/00* (2006.01)
(Continued)

(52) U.S. Cl.
CPC .......... *H02J 7/0072* (2013.01); *H02J 7/0026* (2013.01); *H02M 1/12* (2013.01); *H02M 1/32* (2013.01);
(Continued)

(58) Field of Classification Search
CPC ........ H02M 1/12; H02M 1/32; H02M 1/4216; H02M 1/4225; H02M 3/158; H02M 7/06;
(Continued)

(56) References Cited

U.S. PATENT DOCUMENTS 5,563,487 A    10/1996  Davis
6,181,583 B1 *  1/2001  Okui ................... H02M 1/4208
                                                     363/45

(Continued)

FOREIGN PATENT DOCUMENTS

JP    H07-177742 A    7/1995
JP    H08-051790 A    2/1996
(Continued)

OTHER PUBLICATIONS

International Search Report of the International Searching Authority dated Feb. 4, 2014 for the corresponding international application No. PCT/JP2013/081819 (and English translation).

*Primary Examiner* — Rita Leykin
(74) *Attorney, Agent, or Firm* — Posz Law Group, PLC

(57) ABSTRACT

The DC power-supply device includes a rectifier circuit rectifying an alternating current, a reactor connected to an input or output side of the rectifier circuit, a first capacitor and a second capacitor serially connected between output terminals to a load, and a charging unit that selectively charges one or both of the first capacitor and the second capacitor. A ratio, to a period obtained by combining a charging period and a non-charging period of a pair of the first capacitor and the second capacitor, of the non-charging period, is controlled according to an operating condition of the load, to change a charging frequency of the first capacitor and the second capacitor based on the ratio, at the time of controlling an output voltage to the load.

19 Claims, 14 Drawing Sheets

(51) Int. Cl.
*H02M 1/12* (2006.01)
*H02M 1/32* (2007.01)
*H02M 1/42* (2007.01)
*H02M 3/158* (2006.01)
*H02M 7/06* (2006.01)
*H02M 7/487* (2007.01)
*H02M 7/5387* (2007.01)
*H02M 7/5395* (2006.01)
*H02P 27/08* (2006.01)
*H02M 1/00* (2006.01)
*H02J 7/34* (2006.01)

(52) U.S. Cl.
CPC ....... *H02M 1/4216* (2013.01); *H02M 1/4225* (2013.01); *H02M 3/158* (2013.01); *H02M 7/06* (2013.01); *H02M 7/487* (2013.01); *H02M 7/5387* (2013.01); *H02M 7/5395* (2013.01); *H02P 27/085* (2013.01); *H02J 7/345* (2013.01); *H02M 2001/007* (2013.01); *H02P 2201/09* (2013.01); *Y02B 70/126* (2013.01)

(58) Field of Classification Search
CPC .. H02M 7/487; H02M 7/5387; H02M 7/5395; H02P 27/085; Y02B 70/126; H02J 7/0072; H02J 7/0026; H02J 7/345; H02J 2007/0067
USPC .............. 318/400.26; 320/166, 124; 323/233
See application file for complete search history.

(56) References Cited

U.S. PATENT DOCUMENTS

| | | | | |
|---|---|---|---|---|
| 7,274,579 | B2* | 9/2007 | Ueda | H02M 5/458 363/125 |
| 7,646,165 | B2* | 1/2010 | Ueda | H02M 5/458 318/801 |
| 8,378,686 | B2* | 2/2013 | Kang | G01R 15/16 320/132 |
| 8,498,136 | B2* | 7/2013 | Shinomoto | H02M 1/4208 363/125 |
| 8,975,857 | B2* | 3/2015 | Kawamura | H02P 27/085 318/801 |
| 9,118,251 | B2* | 8/2015 | Matsuura | H02M 3/33507 |
| 9,143,002 | B2* | 9/2015 | Yeo | H02J 5/005 |
| 9,302,591 | B2* | 4/2016 | Huang | H02J 50/05 |
| 9,438,062 | B2* | 9/2016 | Yeo | H02J 7/025 |
| 9,692,289 | B2* | 6/2017 | Kamiya | H02M 1/12 |
| 2006/0011595 | A1 | 1/2006 | Daniel et al. | |
| 2006/0175313 | A1 | 8/2006 | Kooken et al. | |
| 2006/0213890 | A1 | 9/2006 | Kooken et al. | |
| 2007/0051712 | A1 | 3/2007 | Kooken et al. | |
| 2008/0143425 | A1* | 6/2008 | Ito | H02M 3/073 327/536 |
| 2009/0085537 | A1 | 4/2009 | Nakabayashi et al. | |
| 2012/0299529 | A1* | 11/2012 | Guo | H02J 7/35 320/101 |
| 2012/0305535 | A1 | 12/2012 | Daniel et al. | |
| 2015/0014290 | A1 | 1/2015 | Kooken et al. | |
| 2016/0079845 | A1* | 3/2016 | Kamiya | H02M 1/12 318/400.3 |
| 2016/0190955 | A1* | 6/2016 | Hatakeyama | H02M 3/158 318/3 |
| 2016/0265822 | A1* | 9/2016 | Kamiya | H02M 7/062 |

FOREIGN PATENT DOCUMENTS

| | | |
|---|---|---|
| JP | H09-107681 A | 4/1997 |
| JP | 2000-278955 A | 10/2000 |
| JP | 2001-224178 A | 8/2001 |
| JP | 2002-176778 A | 6/2002 |
| JP | 2004-129420 A | 4/2004 |
| JP | 2004-180422 A | 6/2004 |
| JP | 2006-223092 A | 8/2006 |
| JP | 2006-271185 A | 10/2006 |
| JP | 2008-012586 A | 1/2008 |
| JP | 2009-050109 A | 3/2009 |
| JP | 2011-078290 A | 4/2011 |
| JP | 2013-038921 A | 2/2013 |
| WO | 2007/110954 A1 | 10/2007 |
| WO | 2014/207824 A1 | 12/2014 |

* cited by examiner

DC POWER-SUPPLY DEVICE AND REFRIGERATION-CYCLE APPLICATION DEVICE INCLUDING THE SAME

CROSS REFERENCE TO RELATED APPLICATION

This application is a U.S. national stage application of International Patent Application No. PCT/JP2013/081819 filed on Nov. 26, 2013, the disclosure of which is incorporated herein by reference.

TECHNICAL FIELD

The present invention relates to a DC power-supply device and a refrigeration-cycle application device including the same.

BACKGROUND

Conventionally, in a DC power-supply device that increases an output voltage to be higher than an input voltage and outputs the voltage, there has been proposed a circuit in which a booster circuit is configured to have a reactor, a group of serially connected switching elements, a group of serially connected capacitors, and a diode that prevents backflow from the capacitors, to suppress an increase in withstand voltage of the switching elements due to a boosted voltage. Particularly, there is a technique of driving a three-level inverter using a midpoint voltage and a voltage between both ends of the serially connected capacitors (see, for example, Patent Literatures 1 and 2).

Patent Literatures

Patent Literature 1: International Publication No. WO 2007/110954
Patent Literature 2: Japanese Patent Application Laid-open No. 2013-38921

According to the technique described in Patent Literature 1 described above, a desired output voltage can be acquired by executing on/off control of the switching elements simultaneously and controlling an on-time ratio of the switching elements to be appropriate. However, an excessive short-circuit current flows when the switching elements become an on-state simultaneously, and an overcurrent protection circuit may operate to prevent an overcurrent from flowing to the switching elements, so that an operation of the switching elements is caused to stop (to b off-controlled), thereby causing device stoppage or voltage unbalance in the capacitors is caused due to the temporary stoppage of these switching elements. Also in the technique described in Patent Literature 2 described above, as with the technique described in Patent Literature 1, an excessive short-circuit current flows in an operating mode 1 in which the switching elements performing a boosting operation becomes an on-state simultaneously, and an overcurrent protection circuit is activated to thereby possibly cause device stoppage or voltage unbalance in the capacitor group. Meanwhile, there has been a problem that, when a protection level of the overcurrent protection circuit is to be increased in order to allow the current flowing in a state where the switching elements become an on-state at the same time, a switching element having a large allowable current is required, thereby causing a cost increase.

SUMMARY

The present invention has been achieved in view of the above circumstances, and an object of the present invention is to provide a DC power-supply device having a booster circuit configured to include a reactor, a group of serially connected switching elements, a group of serially connected capacitors, and a diode that prevent backflow from the capacitors, in which device stoppage and voltage unbalance of capacitors due to an activation of an overcurrent protection circuit can be prevented so as to continue a stable operation of the device, even when the switching elements become an on-state simultaneously, while suppressing cost increase, and a refrigeration-cycle application device including the DC power-supply device.

In order to solve the above-mentioned problems and achieve the object, the present invention provides a DC power-supply device that converts an alternating current into a direct current and supplies the direct current to a load, the DC power-supply device comprising: a rectifier circuit to rectify the alternating current; a reactor connected to an input side or an output side of the rectifier circuit; a first capacitor and a second capacitor serially connected between output terminals to the load; a charging unit to selectively charge one or both of the first capacitor and the second capacitor; and a control unit to control the charging unit, wherein the control unit controls a ratio, to a period obtained by combining a charging period and a non-charging period of a pair of the first capacitor and the second capacitor, of the non-charging period, according to an operating condition of the load, to change a charging frequency based on the ratio at the time of controlling an output voltage to the load, the charging frequency being, when the period obtained by combining the charging period and the non-charging period of the first capacitor and the second capacitor is regarded as one cycle, an inverse number of the one cycle.

According to the present invention, it is possible to limit an unnecessary operation of an overcurrent protection circuit caused by a boosting operation, and continue an operation of a device stably, while suppressing cost increase.

DETAILED DESCRIPTION

In what follows, a DC power-supply device and a refrigeration-cycle application device including the same according to embodiments of the present invention will be described with reference to the accompanying drawings. The present invention is not limited to the embodiments shown below.

First Embodiment

Figure 1:
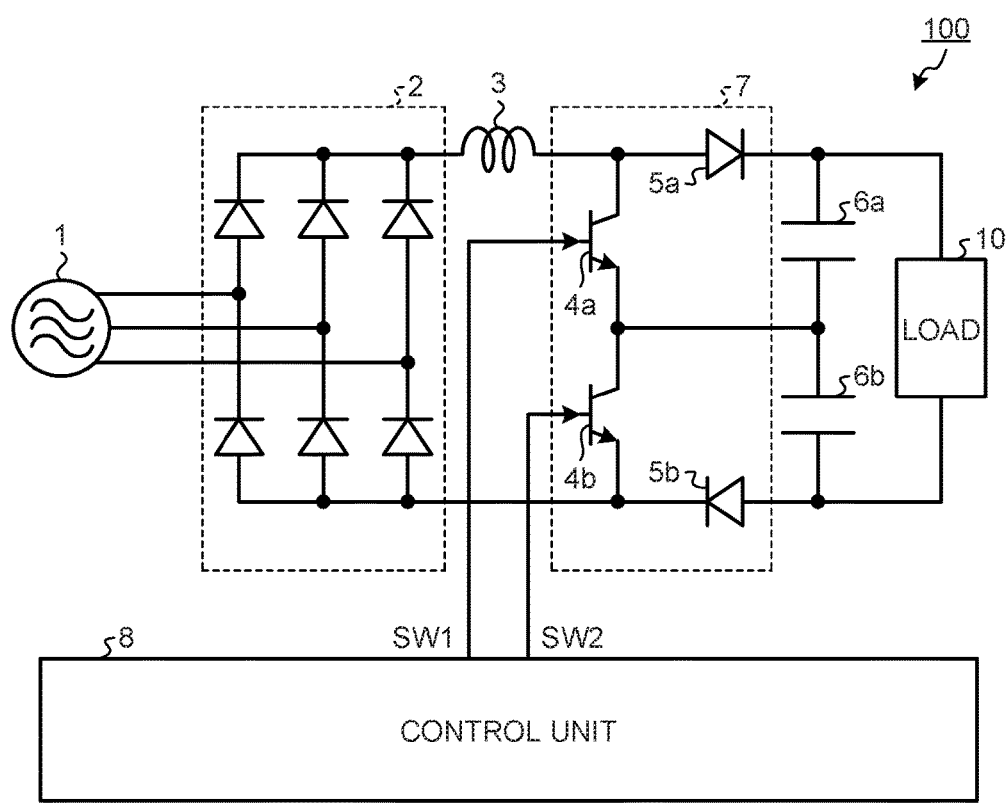
FIG. 1 is a diagram illustrating a configuration example of a DC power-supply device according to a first embodiment.

FIG. 1 is a diagram illustrating a configuration example of a DC power-supply device according to a first embodiment. As illustrated in FIG. 1, a DC power-supply device 100 according to the first embodiment has a configuration in which a three-phase alternating current supplied from an AC power supply 1 is converted into a direct current and the direct current is supplied to a load 10 in accordance with an operation state of the load 10. In the present embodiment, it is assumed that the load 10 is an inverter load that drives a compressor motor used in, for example, a refrigeration-cycle application device, or the like. However, needless to mention, it is not limited thereto.

The DC power-supply device 100 includes a rectifier circuit 2 that rectifies a three-phase alternating current, a reactor 3 connected to an output side of the rectifier circuit 2, a first capacitor 6a and a second capacitor 6b serially connected between output terminals to the load 10, a charging unit 7 that selectively charges one or both of the first capacitor 6a and the second capacitor 6b, and a control unit 8 that controls the charging unit 7. In the example illustrated in FIG. 1, the rectifier circuit 2 is configured as a three-phase full-wave rectifier circuit in which six rectifier diodes are full-bridge connected. In the example illustrated in FIG. 1, while an example in which the reactor 3 is connected to the output side of the rectifier circuit 2 is illustrated, there may be contemplated a configuration in which a reactor is connected to an input side of the rectifier circuit 2 for each phase.

The charging unit 7 includes a first switching element 4a that switches between charging and non-charging of the first capacitor 6a, a second switching element 4b that switches between charging and non-charging of the second capacitor 6b, a first backflow prevention element 5a that prevents backflow of a charged electric charge of the first capacitor 6a to the first switching element 4a, and a second backflow prevention element 5b that prevents backflow of the charged electric charge of the second capacitor 6b to the second switching element 4b.

A midpoint of a series circuit consisting essentially of the first switching element 4a and the second switching element 4b and a midpoint of a series circuit consisting essentially of the first capacitor 6a and the second capacitor 6b are connected to each other. The first backflow prevention element 5a is connected in the forward direction from a collector of the first switching element 4a toward a connection point between the first capacitor 6a and the load 10, and the second backflow prevention element 5b is connected in the forward direction from a connection point between the second capacitor 6b and the load 10 toward an emitter of the second switching element 4b.

Capacitors having the same capacity are used for the first capacitor 6a and the second capacitor 6b, respectively. For the first switching element 4a and the second switching element 4b, for example, a semiconductor element such as a power transistor, a power MOSFET, or an IGBT is used.

The control unit 8 controls a direct current voltage to be supplied to the load 10 by outputting respective PWM signals SW1 and SW2 to execute on/off control of the first switching element 4a and the second switching element 4b according to an operating condition of the load 10. In the case, for example, where the load 10 is the motor and the inverter that drives the motor, the operating condition of the load 10 is, for example, the number of revolutions of a motor or a parameter represented by an output voltage to be output to the inverter that drives the motor. The control for the load 10 may be executed by the control unit 8, or may be executed by another control unit (not illustrated) different from the control unit 8. In a case of a configuration in which the control for the load 10 is executed by the control unit 8, the control unit 8 can ascertain the operating condition of the load 10. In another case of a configuration in which the control for the load 10 is executed by the other control unit (not illustrated) different from the control unit 8, if the operating condition of the load 10 is notified to the control unit 8 from the other control unit, the control unit 8 can ascertain the operating condition of the load 10. The present invention is not limited by the method of ascertaining the operating condition of the load 10 by the control unit 8. The switching control of the first switching element 4a and the second switching element 4b by the control unit 8 is described with reference to FIGS. 1 to 3.

Figure 2:
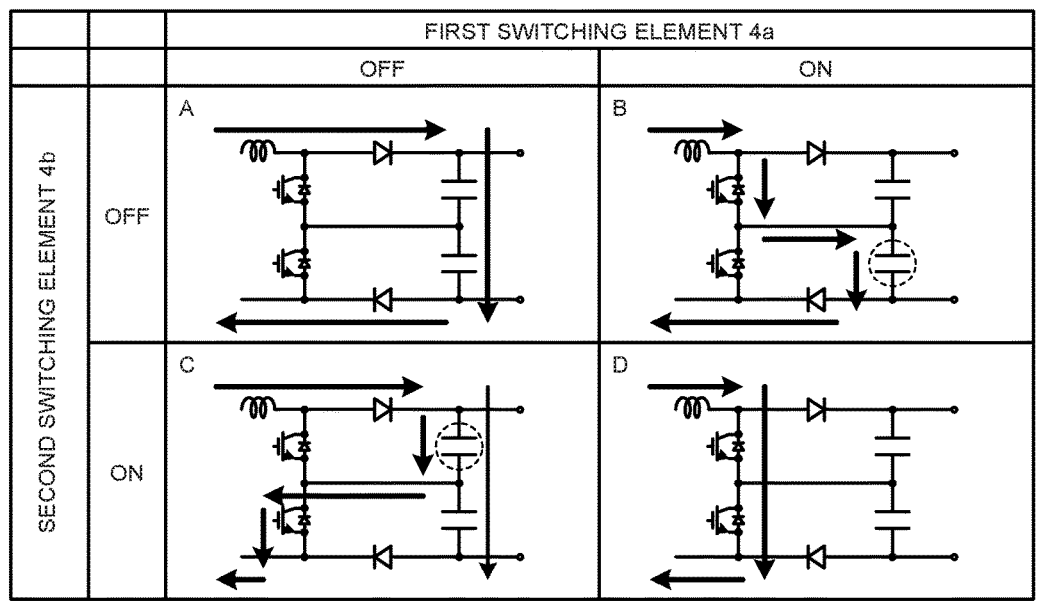
FIG. 2 is a diagram illustrating switching control states in the DC power-supply device according to the first embodiment.

FIG. 2 is a diagram illustrating switching control states in the DC power-supply device according to the first embodiment. In the example illustrated in FIG. 2, reference signs of the constituent elements are omitted.

A state A indicates a state where both the first switching element 4a and the second switching element 4b are controlled to be off. In this state, charging of both the first capacitor 6a and the second capacitor 6b is performed.

A state B indicates a state where only the first switching element 4a is controlled to be on. In this state, only the second capacitor 6b is charged.

A state C indicates a state where only the second switching element 4b is controlled to be on. In this state, only the first capacitor 6a is charged.

A state D indicates a short-circuit state where both the first switching element 4a and the second switching element 4b are controlled to be on. In this state, charging of neither the first capacitor 6a nor the second capacitor 6b is performed.

According to the present embodiment, the control unit 8 appropriately switches the states illustrated in FIG. 2 according to the operation condition of the load 10 to control the direct current voltage to be supplied to the load 10.

Figure 3:
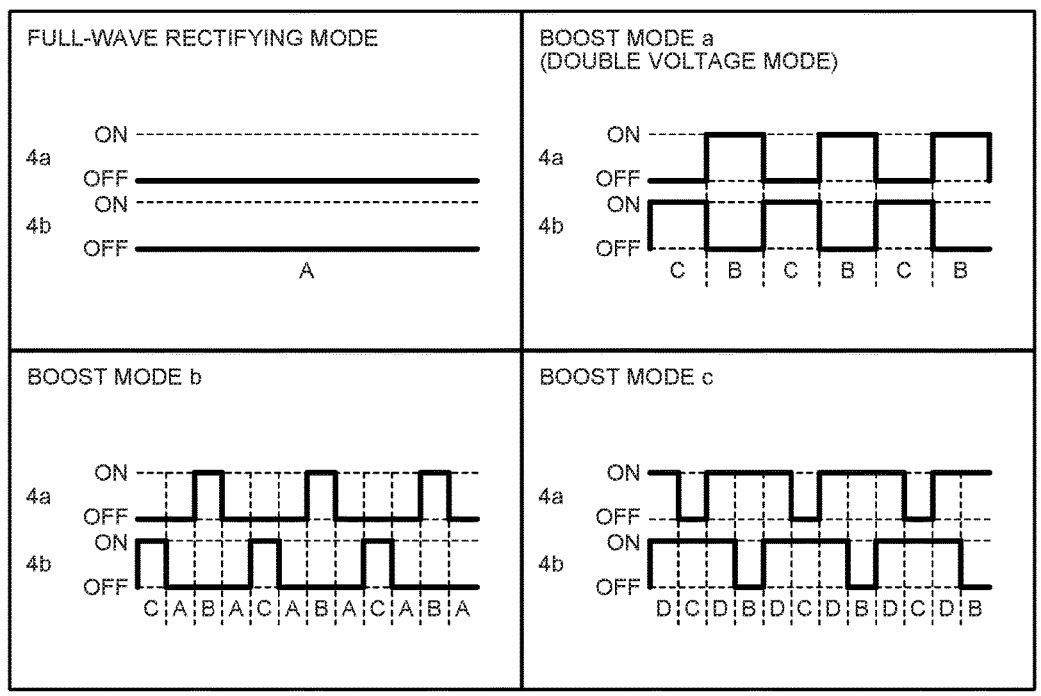
FIG. 3 is a diagram illustrating respective operating modes in the DC power-supply device according to the first embodiment.

FIG. 3 is a diagram illustrating operating modes in the DC power-supply device according to the first embodiment. As illustrated in FIG. 3, as the operating modes in the DC power-supply device 100 according to the first embodiment, there are a full-wave rectifying mode in which the first switching element 4a and the second switching element 4b are always in an off-controlled state, and boost modes in which the first switching element 4a and the second switching element 4b are alternately controlled to be on.

The boost modes include: a boost mode a (double voltage mode) in which an on-duty of the first switching element 4a and the second switching element 4b is 50% (namely, a rate of a non-charging period of the first capacitor 6a and the second capacitor 6b); a boost mode b in which the on-duty of the first switching element 4a and the second switching element 4b is less than 50%; and a boost mode c in which the on-duty of the first switching element 4a and the second switching element 4b is larger than 50%.

In the full-wave rectifying mode, by controlling the first switching element 4a and the second switching element 4b to be always in an off-controlled state, a voltage full-wave-rectified by the rectifier circuit 2 becomes an output voltage.

In the boost mode a (double voltage mode), an on-timing of the first switching element 4a and an off-timing of the second switching element 4b are substantially simultaneous, and an off-timing of the first switching element 4a and an on-timing of the second switching element 4b are substantially simultaneous, thereby repeating the state B and the state C illustrated in FIG. 2. The output voltage at this time is about twice as high as the output voltage in the full-wave rectifying mode.

In the boost mode b, a simultaneous-off period is provided, in which both the first switching element 4a and the second switching element 4b are controlled to be off. At this time, a state transition of the states C→A→B→A illustrated in FIG. 2 is periodically repeated. The output voltage at this time is an intermediate voltage between the output voltage in the full-wave rectifying mode and the output voltage in the boost mode a (double voltage mode).

In the boost mode c, a simultaneous-on period is provided, in which both the first switching element 4a and the second switching element 4b are controlled to be on. At this time, a state transition of the states D→C→D→B illustrated in FIG. 2 is periodically repeated. In this simultaneous-on period (here, a period in the state D), energy is accumulated in the reactor 3. The output voltage at this time is a voltage equal to or higher than the output voltage in the boost mode a (double voltage mode).

Accordingly, a magnitude relation of the output voltages in the modes is full-wave rectifying mode<boost mode b<boost mode a (double voltage mode)<boost mode c.

In this manner, in the present embodiment, by changing the on-duty of the first switching element 4a and the second switching element 4b, the direct-current voltage to be provided to the load 10 can be controlled. Further, the control unit 8 changes the on-duty of the first switching element 4a and the second switching element 4b according to the operating condition of the load 10, and shifts among the full-wave rectifying mode, the boost mode b, the boost mode a (double voltage mode), and the boost mode c. Accordingly, the DC power-supply device 100 outputs a desired output voltage to the load 10.

A charging frequency of the first capacitor 6a and the second capacitor 6b in the respective boost modes of the DC power-supply device 100 according to the first embodiment is described next with reference to FIGS. 1 to 5. It is assumed here that when a period obtained by combining a charging period and a non-charging period of a pair of the first capacitor 6a and the second capacitor 6b, that is, a period obtained by combining an on-period and an off-period of a pair of the first switching element 4a and the second switching element 4b is regarded as one cycle, the charging frequency of the first capacitor 6a and the second capacitor 6b means a switching frequency that is an inverse number of this one cycle. In the following descriptions, the "charging frequency" is used for the description in the expression for the first capacitor 6a and the second capacitor 6b as a subject, and the "switching frequency" is used for the description in the expression for the first switching element 4a and the second switching element 4b as a subject.

In the present embodiment, control is executed so that the charging frequency of the first capacitor 6a and the second capacitor 6b becomes 3n times (n is a natural number) as often as the frequency of the three-phase alternating current. That is, the switching frequency is set to 3 n times the frequency of the three-phase alternating current, and the first switching element 4a and the second switching element 4b are alternately controlled to be on. By executing control in this manner, because distortions appearing in the respective phase currents at the time of executing the switching control occur in the same phase for each phase, and thus the waveforms of the respective phase currents can be similar to each other, while being shifted by 120 degrees with respect to the power supply cycle, and thus unbalance among the phase currents of the three-phase alternating current can be resolved.

On the other hand, when the switching frequency is set to a frequency not equal to 3n times the frequency of the three-phase alternating current, the waveforms of the respective phase currents are not similar to each other, and the phase currents are unbalanced. Also in a case where the switching control is executed in synchronization with the frequency of the three-phase alternating current, the phase currents of the three-phase alternating current are unbalanced in a similar way.

That is, if switching of the first switching element 4a and the second switching element 4b is not performed at a frequency 3n times the frequency of the three-phase alternating current, but is performed with a phase different for each phase, unbalance among the phase currents occurs. As a result, the distortion rates of the phase currents increase, thereby causing deterioration of the power factor and an increase in the harmonic current.

According to the present embodiment, as described above, by executing the control in such a manner that the switching frequency of the first switching element 4a and the second switching element 4b, that is, the charging frequency of the first capacitor 6a and the second capacitor 6b becomes 3n times the frequency of the three-phase alternating current, switching of the first switching element 4a and the second switching element 4b is performed in the same phase for the phases of the three-phase alternating current, while being shifted by 120 degrees with respect to the power supply cycle. Therefore, even in the boost mode b in which there is the simultaneous-off period of the first switching element 4a and the second switching element 4b, or the boost mode c in which there is the simultaneous-on period of the first switching element 4a and the second switching element 4b, the waveforms of the respective phase currents of the three-phase alternating current are similar to each other. Accordingly, unbalance among the phase currents does not occur, and thus the distortion rate of the phase currents takes a minimum value, thereby enabling to improve the power factor and to suppress the harmonic current.

Furthermore, if n=1 is established, that is, if the first switching element 4a and the second switching element 4b are controlled to be on alternately at a frequency three times the frequency of the three-phase alternating current, then the amount of noise generation can be reduced and influence on other devices connected to the same system can be moderated.

50 Hz and 60 Hz are widely used as the power supply frequency, and when it is required that these frequencies are used differently depending on an installation place, by providing a power-supply voltage detector (not illustrated) such as a sensor that detects a power-supply voltage to detect a zero-cross timing of the power-supply voltage, the frequency of the AC power supply 1 can be ascertained. In addition, by performing the switching operation at a frequency 3 m times (m is a natural number) of 300 Hz that is the least common multiple of 50 Hz and 60 Hz, unbalance among the phase currents can be resolved without ascertaining the frequency of the AC power supply 1, and also contribution to cost reduction is achieved, because the power-supply voltage detector is not required to be provided.

Figure 4:
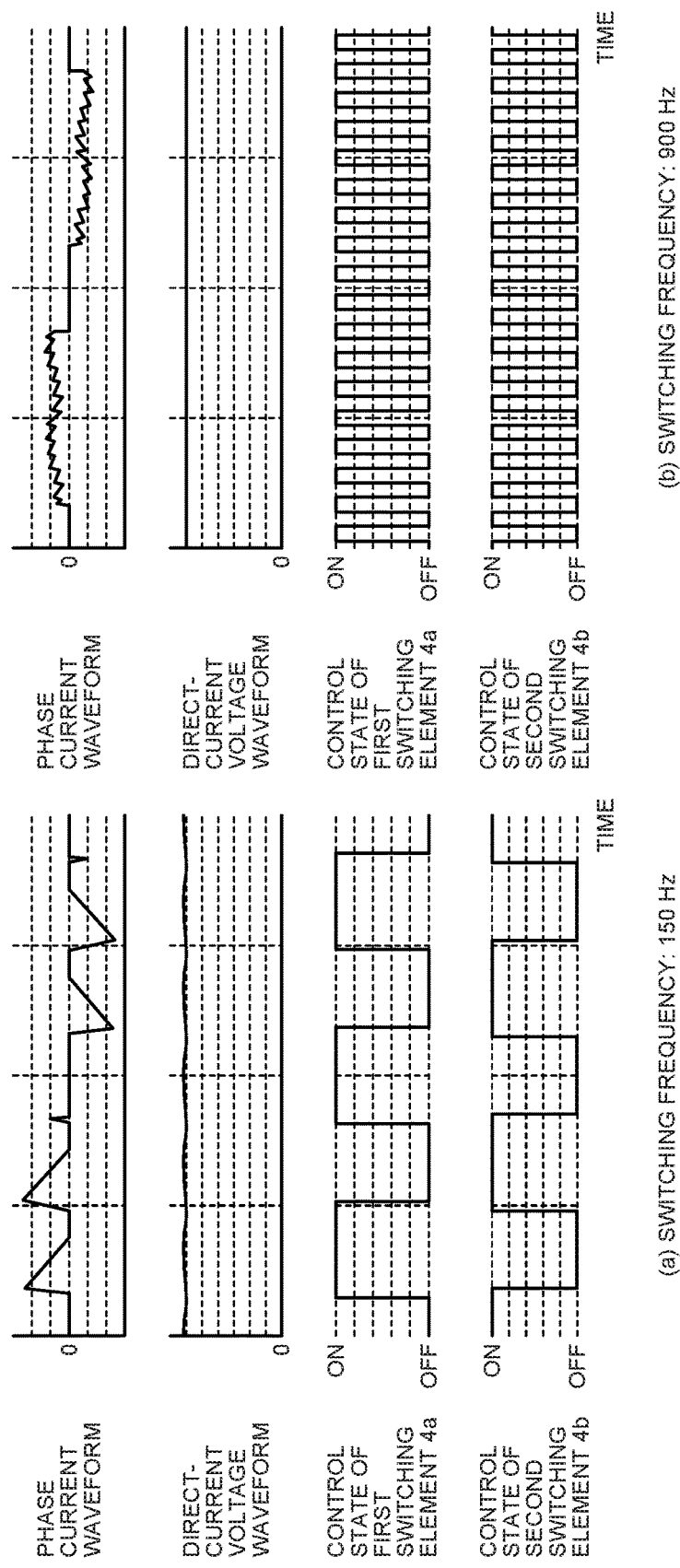
FIG. 4 is a chart illustrating a phase current waveform, a direct-current voltage waveform to be provided to a load, and control states of a first switching element and a second switching element in a boost mode c of the DC power-supply device according to the first embodiment.
Figure 5:
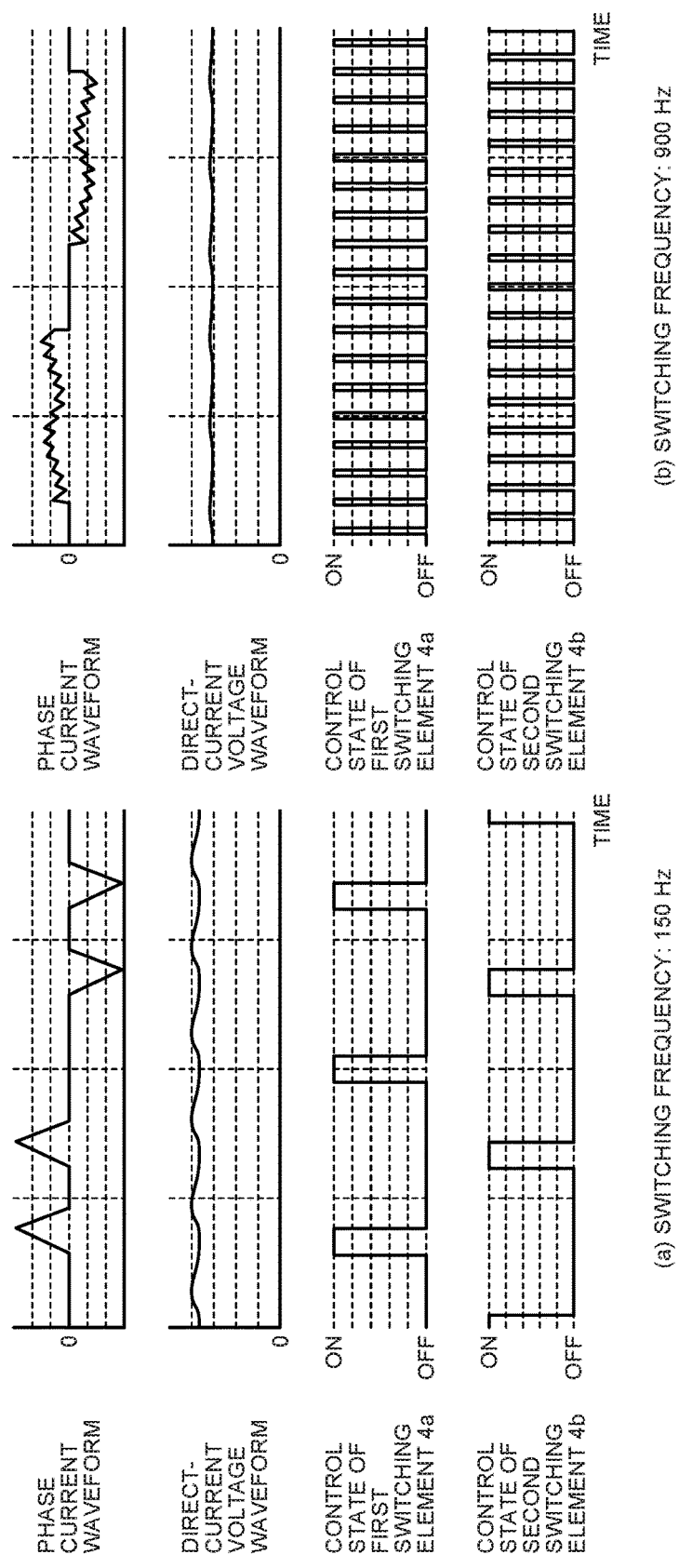
FIG. 5 is a chart illustrating a phase current waveform, a direct-current voltage waveform to be provided to a load, and control states of the first switching element and the second switching element in a boost mode b of the DC power-supply device according to the first embodiment.

Next, description is given with reference to FIGS. 4 and 5 for the switching frequency (that is, the charging frequency of the first capacitor 6a and the second capacitor 6b) in the boost mode c where a section in which the first switching element 4a and the second switching element 4b become an on-state simultaneously (that is, a simultaneous non-charging period of the first capacitor 6a and the second capacitor 6b) arises, and in the boost mode b where a section in which the first switching element 4a and the second switching element 4b become an off-state simultaneously (that is, a simultaneous charging period of the first capacitor 6a and the second capacitor 6b) arises.

FIG. 4 is a chart illustrating a phase current waveform, a direct-current voltage waveform to be provided to a load, and control states of the first switching element and the second switching element in the boost mode c of the DC power-supply device according to the first embodiment. FIG. 5 is a chart illustrating a phase current waveform, a direct-current voltage waveform to be provided to a load, and control states of the first switching element and the second switching element in the boost mode b of the DC power-supply device according to the first embodiment. FIG. 4(a) and FIG. 5(a) show an example in which the switching frequency is set to 3 times the frequency of the three-phase alternating current (150 Hz=50 Hz×3). FIG. 4(b) and FIG. 5(b) show an example in which the switching frequency is set to 18 times the frequency of the three-phase alternating current (900 Hz=50 Hz×3×6).

As illustrated in FIG. 4, when operation is made with the switching frequency being set to 150 Hz that is 3 times the frequency of the three-phase alternating current in the boost mode c where the section in which the first switching element 4a and the second switching element 4b become an on-state simultaneously arises (FIG. 4(a)), a peak value of the phase current waveform is larger than that in a case where operation is made with the switching frequency being set to 900 Hz that is 18 times the frequency of the three-phase alternating current (FIG. 4(b)), and is substantially twice the peak value in FIG. 4(b).

As illustrated in FIG. 5, also in the boost mode b, when operation is made with the switching frequency being set to 150 Hz that is 3 times the frequency of the three-phase alternating current (FIG. 5(a)), the peak value of the phase current waveform is larger than that in the case where operation is made with the switching frequency being set to 900 Hz that is 18 times the frequency of the three-phase alternating current (FIG. 5(b)), and is substantially twice the peak value in FIG. 5(b).

The phase current illustrated in FIGS. 4 and 5 flows to one or both of the switching elements being in an on-state, when one or both of control states of the first switching element 4a and the second switching element 4b constituting the charging unit 7 are on-state.

On the other hand, although not illustrated here, in the boost mode a (double voltage mode) in which the on-duty of the first switching element 4a and the second switching element 4b is 50%, there is no simultaneous-on section or simultaneous-off section of the first switching element 4a and the second switching element 4b. Therefore, the fluctuation in the current amount of the phase current due to change of the switching frequency is small. Additionally, in the full-wave rectifying mode in which the first switching element 4a and the second switching element 4b are always in an off-controlled state, any switching operation is not performed intrinsically. Therefore, the current amount of the phase current does not fluctuate, if the current flowing to the load 10 is constant.

That is, in the boost mode c in which the on-duty of the first switching element 4a and the second switching element 4b is larger than 50% and the simultaneous-on section of the first switching element 4a and the second switching element 4b arises, and in the boost mode b in which the on-duty of the first switching element 4a and the second switching element 4b is less than 50% and the simultaneous-off section of the first switching element 4a and the second switching element 4b arises, fluctuation in the current amount of the phase current is larger than fluctuation in the boost mode a (double voltage mode) in which the on-duty of the first switching element 4a and the second switching element 4b is 50% and neither of the simultaneous-on section and the simultaneous-off section of the first switching element 4a and the second switching element 4b arises. Then, in the case where the switching frequency is low, the current flowing to either one or both of the first switching element 4a and the second switching element 4b constituting the charging unit 7 increases, and an overcurrent protection circuit (not illustrated) is activated to stop (off-control) the switching operation. As a result, a device connected to the DC power-supply device 100, as the load 10, may be stopped. In order to increase the protection level to suppress such an unnecessary operation of the overcurrent protection circuit, that is, in order to increase a current value at which the overcurrent protection circuit is activated, it is required to increase an allowable current value of the first switching element 4a and the second switching element 4b, further to review specification values of the constituent elements constituting the DC power-supply device 100, and to deal with some other matters, and thus a cost increase cannot be avoided.

Accordingly, in the present embodiment, the switching frequency of the first switching element 4a and the second switching element 4b (that is, when a period obtained by combining the charging period and the non-charging period of the first capacitor 6a and the second capacitor 6b is regarded as one cycle, the charging frequency that is set as an inverse number of this one cycle) is changed in accordance with the on-duty of the first switching element 4a and the second switching element 4b (that is, a ratio of the non-charging period to a period obtained by combining the charging period and the non-charging period of a pair of the first capacitor 6a and the second capacitor 6b). Then, when the DC power-supply device 100 is operated in the boost mode b in which the simultaneous-off section of the first switching element 4a and the second switching element 4b (that is, the simultaneous charging period of the first capacitor 6a and the second capacitor 6b) arises, and in the boost mode c in which the simultaneous-on section of the first switching element 4a and the second switching element 4b (that is, the simultaneous non-charging period of the first capacitor 6a and the second capacitor 6b) arises, the DC power-supply device 100 is operated at a switching frequency higher than that when the DC power-supply device 100 is operated in the boost mode a (double voltage mode) in which neither the simultaneous-on section and the simultaneous-off section of the first switching element 4a and the second switching element 4b arises (that is, neither of the simultaneous charging period and the simultaneous non-charging period of the first capacitor 6a and the second capacitor 6b arises). In this manner, because the current amount of a current flowing to the charging unit 7 can be made smaller when the DC power-supply device 100 is operated in the boost mode b and the boost mode c, the allowable current value of the first switching element 4a and the second switching element 4b constituting the charging unit 7 is not required to increase to a higher value than necessary and an unnecessary operation of the overcurrent protection circuit can be prevented.

The amount of the current flowing into the charging unit 7 changes in a stepless manner in the boost modes b and c, according to the lengths of the simultaneous-off section and the simultaneous-on section of the first switching element 4a and the second switching element 4b. In a process of increasing the output voltage, the boost mode a (double voltage mode) is present while the mode is shifted from the boost mode b to the boost mode c. Similarly, in a process of decreasing the output voltage, the boost mode a (double voltage mode) is present while the mode is shifted from the boost mode c to the boost mode b. Accordingly, in an operating range including the boost mode b, the boost mode a (double voltage mode) and the boost mode c, it is favorable to execute control such that the switching frequency of the first switching element 4a and the second switching element 4b (that is, the charging frequency of the first capacitor 6a and the second capacitor 6b) in the boost mode a (double voltage mode) becomes the lowest, and the switching frequency in the operating range in the boost mode b and the boost mode c becomes higher.

Meanwhile, as described above, in the configuration in which the three-phase alternating current illustrated in FIG. 1 is converted into a direct current and supplied to the load, it is desirable to execute control such that the switching frequency of the first switching element 4a and the second switching element 4b is 3 n times the frequency of the three-phase alternating current. That is, when the DC power-supply device is operated in the boost mode b and the boost mode c, control is executed so that the switching frequency of the first switching element 4a and the second switching element 4b becomes 3 m times (m>n) the frequency of the three-phase alternating current. By executing control in this manner, even if when DC power-supply device is operated in the boost mode b and the boost mode c, the waveforms of the phase currents of the three-phase alternating current become similar to each other, and thus, unbalance among the phase currents does not occur, and so the distortion rate of the phase currents takes the minimum value, thereby enabling to decrease the current amount of the current flowing into the first switching element 4a and the second switching element 4b, while improving the power factor and suppressing the harmonic current.

For example, by setting the switching frequency of the first switching element 4a and the second switching element 4b to a frequency 3 times the power-supply frequency of the three-phase alternating current (150 Hz when the power-supply frequency is 50 Hz) in the boost mode a (double voltage mode), and to a frequency (900 Hz) that is 3 times the least common multiple of 50 Hz and 60 Hz, which have been widely used as a power-supply frequency of the three-phase alternating current, in the boost mode b and the boost mode c, the operation of the DC power-supply device 100 can be performed with maximum efficiency without causing an overcurrent shutdown, while suppressing an increase in the switching frequency to the minimum.

As described above, according to the DC power-supply device of the first embodiment, the DC power-supply device has a configuration for converting the three-phase alternating current into a direct current and supplying the direct current to a load, in which the rectifier circuit that rectifies the three-phase alternating current, the reactor connected to the input side or the output side of the rectifier circuit, the first capacitor and the second capacitor serially connected between output terminals to the load, the charging unit that selectively charges one or both of the first capacitor and the second capacitor, and the control unit that controls the charging unit. In the configuration, at the time of controlling the ratio of the non-charging period of the first capacitor and the second capacitor according to the operating condition of the load, the charging frequency is changed according to a ratio of the non-charging period to a period obtained by combining the charging period and the non-charging period of a pair of the first capacitor and the second capacitor, the charging frequency being defined, when a period obtained by combining the charging period and the non-charging period of the first capacitor and the second capacitor is regarded as one cycle, as an inverse number of this one cycle. Then, when the simultaneous charging period of the first capacitor and the second capacitor arises, and when the simultaneous non-charging period of the first capacitor and the second capacitor arises, the DC power-supply device is operated at a switching frequency higher than that when neither of the simultaneous charging period and the simultaneous non-charging period of the first capacitor and the second capacitor arises. Accordingly, the amount of a current flowing into the charging unit can be decreased in the simultaneous charging period of the first capacitor and the second capacitor and in the simultaneous non-charging period of the first capacitor and the second capacitor. Consequently, the allowable current value of the first switching unit and the second switching unit constituting the charging unit is not required to increase to be more than necessary, and an unnecessary operation of the overcurrent protection circuit can be prevented.

That is, an unnecessary operation of the overcurrent protection circuit associated with the boosting operation can be suppressed, and a stable operation of the device connected to the DC power-supply device can be continued, while suppressing a cost increase.

Furthermore, when the three-phase alternating current is supplied from the alternating-current power supply, by executing control such that the charging frequency of the first capacitor and the second capacitor becomes 3 n times (n is a natural number) the frequency of the three-phase alternating current, the waveforms of the phase currents of the three-phase alternating current become similar to each other, and thus unbalance among the phase currents does not occur, and so the distortion rate of the phase currents takes the minimum value, thereby enabling to minimize the current amount of a current flowing into the first switching element and the second switching element constituting the charging unit, while improving the power factor and suppressing the harmonic current.

Second Embodiment

In the first embodiment, there has been described an example in which when the DC power-supply device is to be operated in the boost mode b in which the simultaneous-off section of the first switching element and the second switching element arises, and in the boost mode c in which the simultaneous-on section of the first switching element and the second switching element arises, the DC power-supply device is operated at a switching frequency higher than that in the boost mode a (double voltage mode) in which neither the simultaneous-on section and the simultaneous-off section of the first switching element and the second switching element arises, thereby suppressing the unnecessary operation of the overcurrent protection circuit and continuing the operation of the device connected to the DC power-supply device stably. However, in the present embodiment, description is given for a configuration in which even if a constituent element constituting the DC power-supply device has a fault, a device connected to the DC power-supply device can be continuously operated, while suppressing an unnecessary operation of an overcurrent protection circuit.

Figure 6:
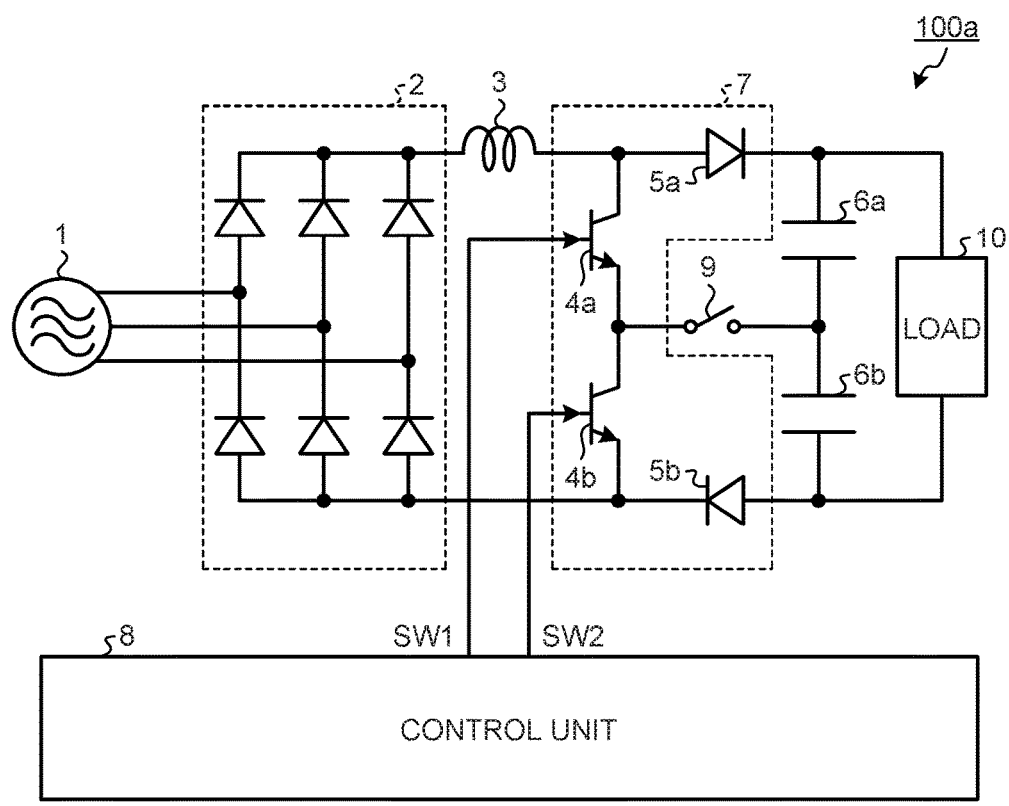
FIG. 6 is a diagram illustrating a configuration example of a DC power-supply device according to a second embodiment.

FIG. 6 is a diagram illustrating a configuration example of the DC power-supply device according to the second embodiment. As illustrated in FIG. 6, in a DC power-supply device 100a according to the second embodiment, in addition to the configuration illustrated in FIG. 1 described in the first embodiment, a midpoint of a series circuit consisting essentially of the first switching element 4a and the second switching element 4b is connected with a midpoint of a series circuit consisting essentially of the first capacitor 6a and the second capacitor 6b via an open and close switch 9.

Figure 7:
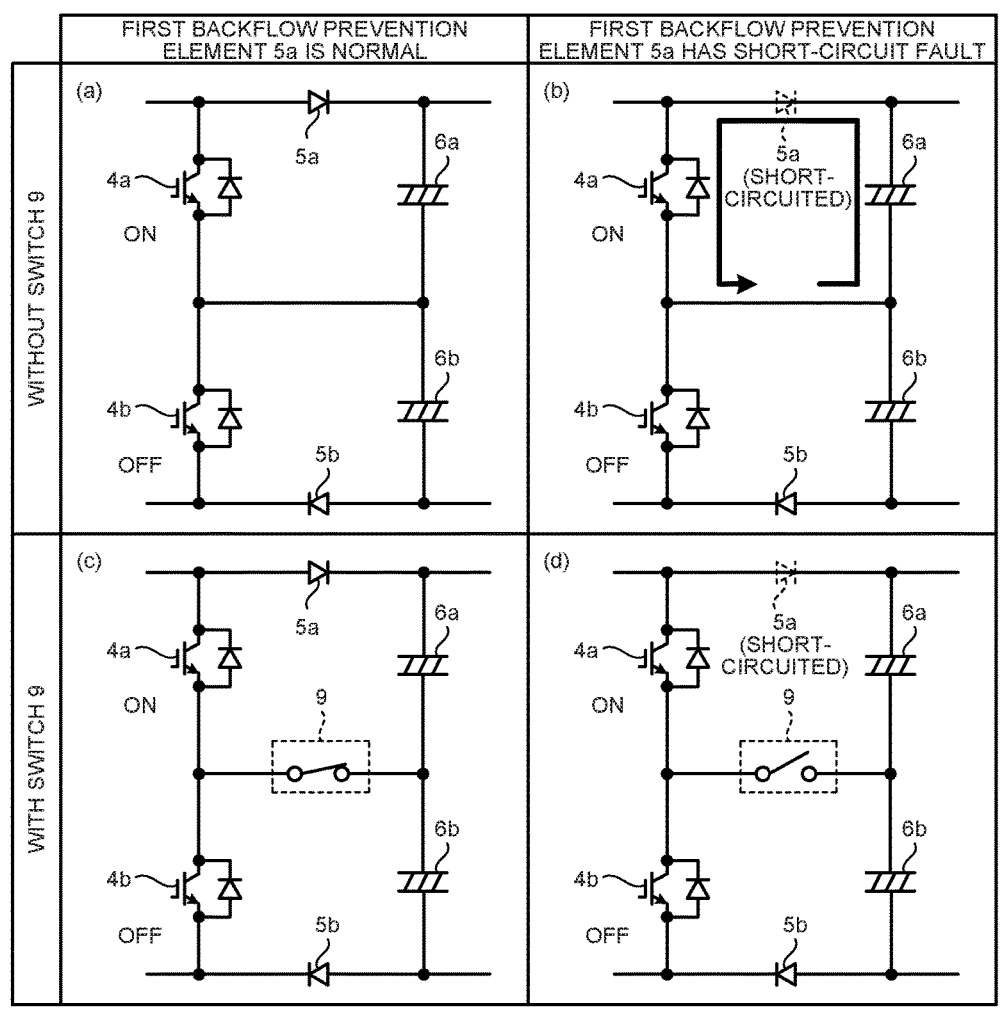
FIG. 7 is an explanatory diagram of operation examples when a first backflow prevention element has a short-circuit fault in the DC power-supply device according to the second embodiment.

First, an operation in the case where the first backflow prevention element 5a has a short-circuit fault is described with reference to FIG. 7. FIG. 7 is an explanatory diagram of an operation example when the first backflow prevention element has a short-circuit fault in the DC power-supply device according to the second embodiment. In an example illustrated in FIG. 7, an operation example is described in which the first switching element 4a is on-controlled and the second switching element 4b is off-controlled, and an electric potential of the first capacitor 6a is high with respect to the first switching element 4a.

(a) and (b) of FIG. 7 illustrate a configuration not having the switch 9. FIG. 7(a) illustrates a case where the first backflow prevention element 5a is normal. FIG. 7(b) illustrates a case where the first backflow prevention element 5a has a short-circuit fault. (c) and (d) of FIG. 7 illustrate a configuration according to the second embodiment having the switch 9. FIG. 7(c) illustrates a case where the first backflow prevention element 5a is normal. FIG. 7(d) illustrates a case where the first backflow prevention element 5a has a short-circuit fault.

Even in a configuration without the switch 9, as long as the first backflow prevention element 5a is normal (FIG. 7(a)), the voltage of the first capacitor 6a, which has a high value due to the boosting operation, is not applied to the first switching element 4a. However, if the first backflow prevention element 5a has a short-circuit fault (FIG. 7(b)), the voltage of the first capacitor 6a is applied to the first switching element 4a via the first backflow prevention element 5a having a short-circuit fault (in a direction of a solid-line arrow shown in FIG. 7), and the first switching element 4a may have a secondary breakdown. At this time, the electric charge accumulated in the first capacitor 6a is discharged, and thus voltage unbalance may occur between the first capacitor 6a and the second capacitor 6b.

In the configuration according to the second embodiment having the switch 9, when the first backflow prevention element 5a is normal (FIG. 7(c)), the switch 9 is controlled to be closed. In this state, the voltage of the first capacitor 6a having a high value due to the boosting operation, cannot be applied to the first switching element 4a. On the other hand, in a case where the first backflow prevention element 5a has a short-circuit fault (FIG. 7(d)), the switch 9 is controlled to be opened. Accordingly, backflow from the first capacitor 6a having a high voltage due to the boosting operation to the first switching element 4a can be prevented, thereby making it possible to prevent the voltage of the first capacitor 6a from being applied to the first switching element 4a. In this case, at least one of the first switching element 4a and the second switching element 4b is off-controlled, thereby accumulating the electric charge equally in the first capacitor 6a and the second capacitor 6b. Accordingly, voltage unbalance does not occur, and even when a device, which needs to be connected to a neutral point being a connection point of the series circuit consisting essentially of the first capacitor 6a and the second capacitor 6b, is connected as the load 10, stable voltage supply can be realized. Therefore, by setting the operating mode in the DC power-supply device 100a according to the second embodiment to, for example, the full-wave rectifying mode in which the first switching element 4a and the second switching element 4b are always in an off-controlled state, an operation of the device connected to the DC power-supply device 100a can be continued.

Figure 8:
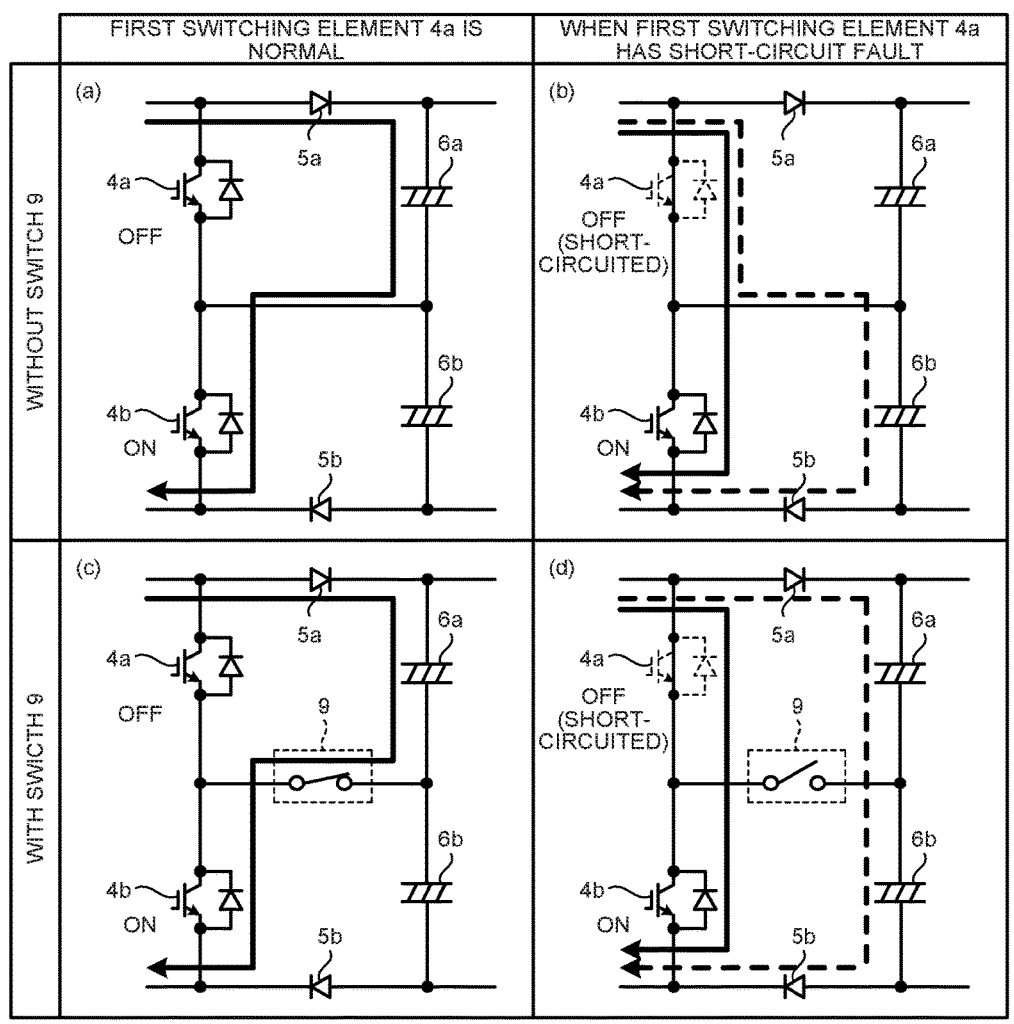
FIG. 8 is an explanatory diagram of operation examples when the first switching element has a short-circuit fault in the DC power-supply device according to the second embodiment.

An operation when the first switching element 4a has a short-circuit fault is described next with reference to FIG. 8. FIG. 8 is an explanatory diagram of an operation example when the first switching element has a short-circuit fault in the DC power-supply device according to the second embodiment.

(a) and (b) of FIG. 8 illustrate a configuration not having the switch 9. FIG. 8(a) illustrates a case where the first switching element 4a is normal, and FIG. 8(b) illustrates a case where the first switching element 4a has a short-circuit fault. (c) and (d) of FIG. 8 illustrate a configuration according to the second embodiment having the switch 9. FIG. 8(c) illustrates a case where the first switching element 4a is normal, and FIG. 8(d) illustrates a case where the first switching element 4a has a short-circuit fault. In the example illustrated in FIG. 8, the solid-line arrows illustrated in the figure indicate a current path in which a current flows when the first switching element 4a is off-controlled and the second switching element 4b is on-controlled, and the The broken-line arrows in the figure indicate a current path in which a current flows when the first switching element 4a has a short-circuit fault, and the second switching element 4b is off-controlled.

Even in the configuration not having the switch 9, as long as the first switching element 4a is normal (FIG. 8(a)), by off-controlling the first switching element 4a and on-controlling the second switching element 4b, a current flows in a route of the first backflow prevention element 5a→the first capacitor 6a→the second switching element 4b (the solid-line arrow in FIG. 8(a)), thereby making the first capacitor 6a to be charged. However, if the first switching element 4a has a short-circuit fault (FIG. 8(b)), a short-circuit current flows in a route of the first switching element 4a→the second switching element 4b (the solid-line arrow in FIG. 8(b)), although the first switching element 4a is off-controlled. In this state, in any of the operating modes described in the first embodiment, the situation is the same as a case where the first switching element 4a is always on-controlled. Then, in the boost mode a (double voltage mode) and the boost mode b, the simultaneous non-charging period of the first capacitor 6a and the second capacitor 6b is caused, and also in the boost mode c, the simultaneous non-charging period of the first capacitor 6a and the second capacitor 6b becomes long. For this reason, as described in the first embodiment, even if control is executed such that the DC power-supply device is operated in the boost mode b and the boost mode c at a switching frequency higher than that of the boost mode a (double voltage mode), the overcurrent protection circuit (not illustrated) is activated to stop the switching operation of the first switching element 4a and the second switching element 4b (off-control). In this case, a current flows in a route of the first switching element 4a→the second capacitor 6b→the second backflow prevention element 5b (the broken-line arrow in FIG. 8(b)), so that only the second capacitor 6b is charged continuously, thereby causing voltage unbalance between the first capacitor 6a and the second capacitor 6b. Particularly, when a device, which needs to be connected to the neutral point being the connection point of the series circuit consisting essentially of the first capacitor 6a and the second capacitor 6b, is connected as the load 10, the device may not operate normally, or for example, in the case of a motor load or the like, increase in vibration and heat generation may occur.

In the configuration according to the second embodiment including the switch 9, when the first switching element 4a is normal (FIG. 8(c)), the switch 9 is controlled to be closed, and a current flows in a route of the first backflow prevention element 5a→the first capacitor 6a→the second switching element 4b (the solid-line arrow in FIG. 8(c)), thereby charging the first capacitor 6a. However, if the first switching element 4a has a short-circuit fault (FIG. 8(d)), the switch 9 is controlled to be opened, and the second switching element 4b is off-controlled. Therefore, a current flows in a route of the first backflow prevention element 5a→the first capacitor 6a→the second capacitor 6b→the second backflow prevention element 5b (the broken-line arrow in FIG. 8(d)), so that the electric charge is stored equally in the first capacitor 6a and the second capacitor 6b. Accordingly, voltage unbalance does not occur, and even if a device, which needs to be connected to a neutral point being the connection point of the series circuit consisting essentially of the first capacitor 6a and the second capacitor 6b, is connected as the load 10, stable voltage supply can be realized. Therefore, by setting the operating mode in the DC power-supply device 100a according to the second embodiment to, for example, the full-wave rectifying mode in which the first switching element 4a and the second switching element 4b are always in an off-controlled state, an operation of the device connected to the DC power-supply device 100a can be continued.

The switch 9 can be configured by using an electromagnetic contactor such as a relay or contactor, or a semiconductor switching element such as an IGBT or FET, and needless to say, the similar function can be realized by using any means, so long as it is possible to have an electrically opening and closing function. When the electromagnetic contactor is used as the switch 9, it is desired to use a DC relay or the like that can open and close itself with a direct current. Further, when the switch 9 is configured by using the semiconductor switching element such as the IGBT, the semiconductor switching element including a flywheel diode for reflux flow therein becomes conductive in a forward direction of the flywheel diode. Therefore, it is required to use a semiconductor switching element that does not include the flywheel diode. Further, the MOSFET and the like include a parasitic diode, and so those cannot be used as the switch 9.

Further, when a relay is used as the switch 9, if the opening/closing operation is performed while the first backflow prevention element 5a and the second backflow prevention element 5b, or the first switching element 4a and the second switching element 4b have short-circuit faults and an excessive current is flowing therethrough, then an arc may be generated between contact points thereof, thereby decreasing the life of the contact points.

In the case where the DC power-supply device 100a is operating in the full-wave rectifying mode illustrated in FIG. 3 described in the first embodiment, when at least one of the first switching element 4a and the second switching element 4b is normal or has an open fault, a current does not flow to the switch 9, and thus there is no problem even if open control is executed at any timing.

Meanwhile, in the case where the DC power-supply device 100a is operating in the boost mode a, the first switching element 4a and the second switching element 4b are alternately on-controlled. Therefore, a state exist in which a current is flowing to the switch 9, regardless of whether the first backflow prevention element 5a and the second backflow prevention element 5b, or the first switching element 4a and the second switching element 4b have short-circuit faults. If the switch 9 is controlled to be opened in this state, an arc may be generated as described above. Therefore, if the DC power-supply device 100a is operating in the boost mode a, it is favorable to control to open the switch 9 after the mode is shifted to the full-wave rectifying mode.

When the DC power-supply device 100a is operating in the boost mode b, if the first switching element 4a and the second switching element 4b are normal, a current does not flow to the switch 9 in the simultaneous off section of the first switching element 4a and the second switching element 4b. Therefore, it is favorable to control the switch 9 to be opened in this section. Further, when the DC power-supply device 100a is operating in the boost mode c, if the first switching element 4a and the second switching element 4b are normal, a current flows in a route of the first switching element 4a→the second switching element 4b in the simultaneous-on section of the first switching element 4a and the second switching element 4b, and a current does not flow to the switch 9. Therefore, it is favorable to control the switch 9 to be opened in this section.

When the DC power-supply device 100a is operating in the boost mode b or the boost mode c, if at least one of the first switching element 4a and the second switching element 4b has a short-circuit fault, although a case where the first switching element 4a has a short-circuit fault is described here, in a state where the switch 9 is controlled to be closed, as shown by the broken-line arrow in FIG. 8(b), the charging current always flows to the second capacitor 6b. Therefore, it is favorable to provide a detector and the like (not illustrated) that detects the current flowing to the switch 9, and control the switch 9 to be opened when the current flowing to the switch 9 has no problem for the opening/closing control of the switch 9, that is, when the current decreases to a degree at which any arc cannot be generated.

Furthermore, when the switch 9 is controlled to be opened, surge may be caused due to a wiring impedance component, and this may cause a secondary fault of constituent elements constituting the DC power-supply device 100a. Therefore, it is desired to provide a resistor and/or a diode (not illustrated) for absorbing surges, thereby enabling to improve the reliability.

As described above, according to the DC power-supply device of the second embodiment, the configuration is such that the midpoint of the series circuit consisting essentially of the first switching element and the second switching element and the midpoint of the series circuit consisting essentially of the first capacitor and the second capacitor are connected to each other via the switch. Then, when any of the first backflow prevention element, the second backflow prevention element, the first switching element, and the second switching element has a short-circuit fault, the switch is controlled to be opened and the DC power-supply device is operated in the full-wave rectifying mode. Accordingly, in addition to the effects described in the first embodiment, even if any of the first backflow prevention element, the second backflow prevention element, the first switching element, and the second switching element has a short-circuit fault, voltage unbalance is not caused between the first capacitor and the second capacitor, and power can be stably supplied to the load. Further, operations of the device connected to the DC power-supply device as the load can be continued without causing device stoppage due to the overcurrent protection function, thereby enabling to acquire a DC power-supply device having high reliability.

Third Embodiment

Figure 9:
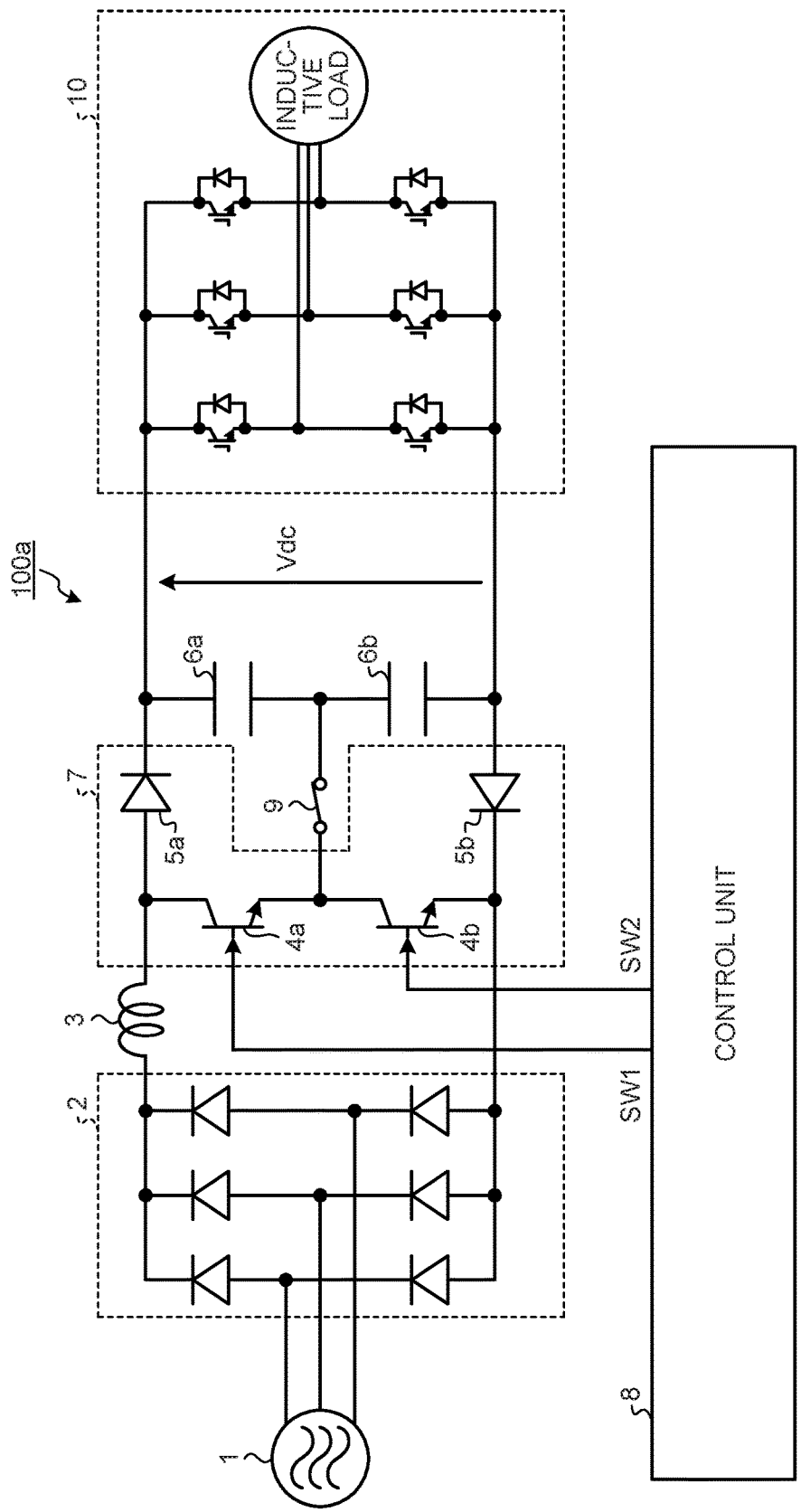
FIG. 9 is a diagram illustrating an example in which a two-level inverter that drives an inductive load is connected, as a load of a DC power-supply device.
Figure 10:
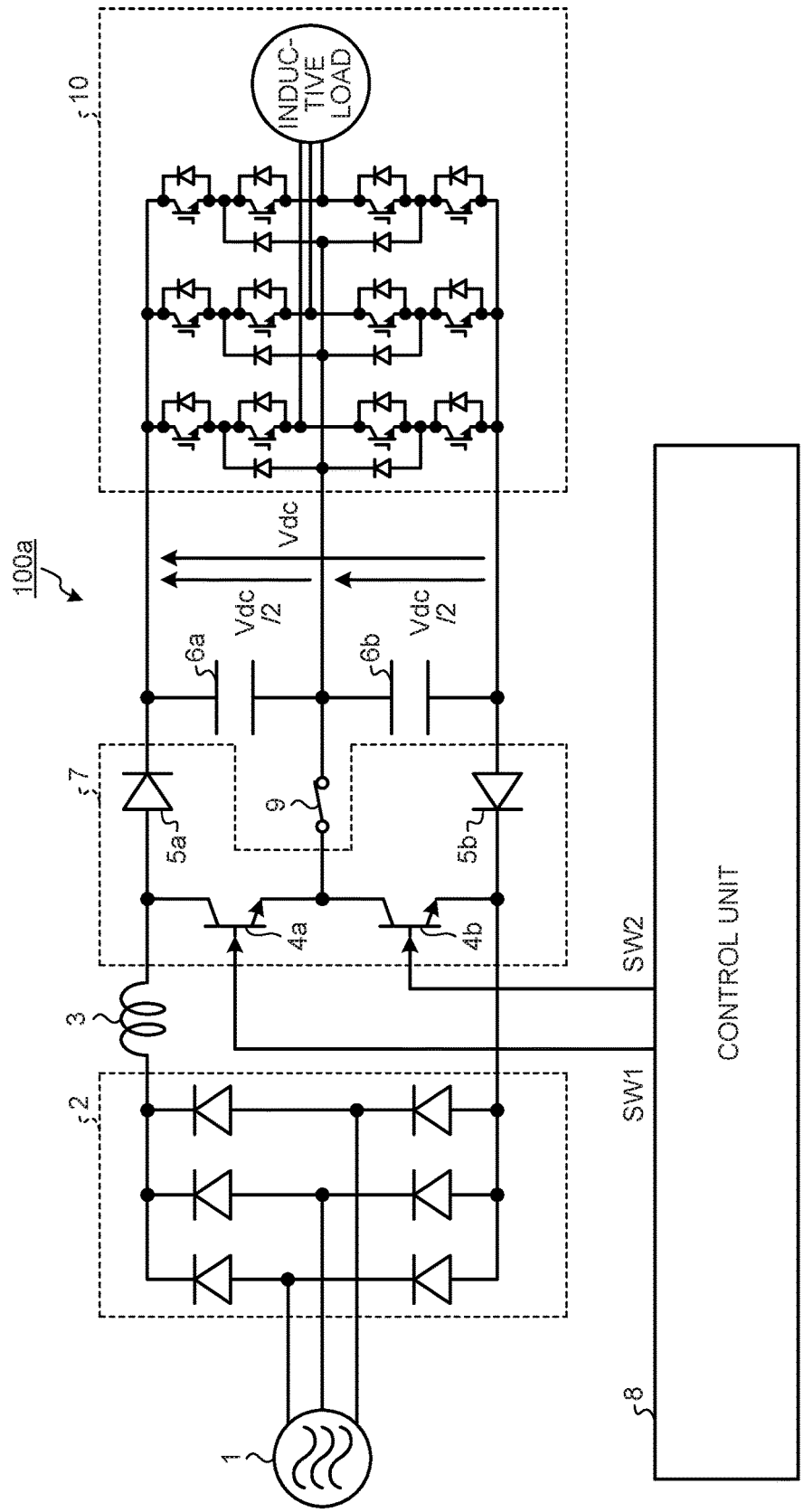
FIG. 10 is a diagram illustrating an example in which a three-level inverter that drives an inductive load is connected, as a load of the DC power-supply device.
Figure 11:
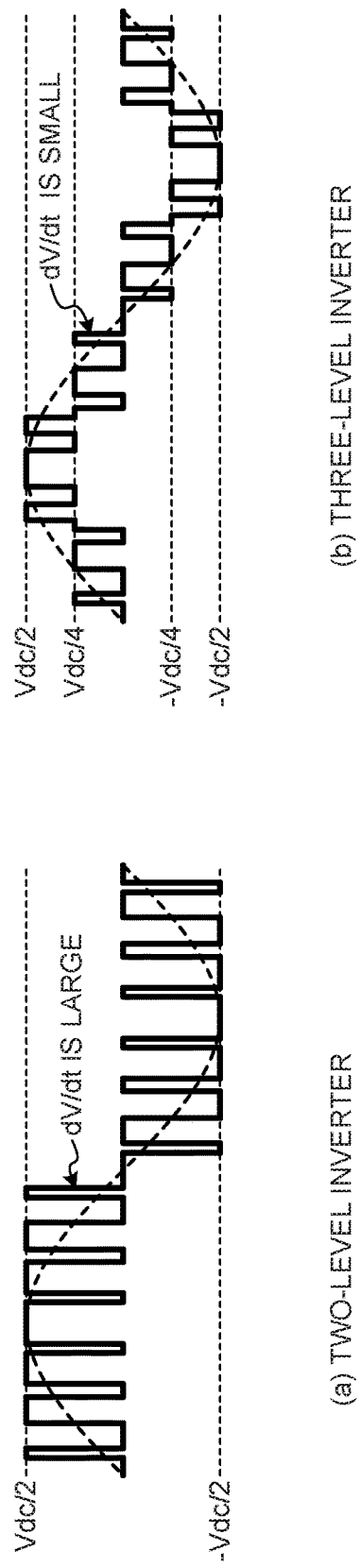
FIG. 11 is a chart illustrating inter-line voltage waveforms of the two-level inverter and the three-level inverter.

In the present embodiment, description is given for the load to be connected to the DC power-supply device described in the first and second embodiments. FIG. 9 is a diagram illustrating an example in which a two-level inverter that drives an inductive load is connected as the load of the DC power-supply device. FIG. 10 is a diagram illustrating an example in which a three-level inverter that drives an inductive load is connected as the load of the DC power-supply device. FIG. 11 is a chart illustrating inter-line voltage waveforms of the two-level inverter and the three-level inverter. FIG. 11(a) illustrates an inter-line voltage waveform of the two-level inverter and FIG. 11(b) illustrates an inter-line voltage waveform of the three-level inverter. A configuration of the DC power-supply device 100a according to the third embodiment is identical to that of the second embodiment, and thus explanation therefor is omitted here.

An inter-line voltage to be applied to the inductive load connected to the two-level inverter has two levels of ±Vdc/2 and 0, as illustrated in FIG. 11(a). Meanwhile, an inter-line voltage to be applied to the inductive load connected to the three-level inverter has three levels of ±Vdc/2, ±Vdc/4 and 0, as illustrated in FIG. 11(b), and a time change amount (dV/dt) of the inter-line voltage of the inductive load decreases to half the time change amount of the two-level inverter. That is, in the three-level inverter, generation of noise and surges can be suppressed to a greater degree than in the two-level inverter.

Particularly, in the boost modes including the boost mode a (double voltage mode), the boost mode b and the boost mode c that can output a larger voltage than the output voltage in the full-wave rectifying mode, the suppression effect of generation of noise and surges is large, and for example, in the boost mode a (double voltage mode) that can output a voltage substantially twice the output voltage in the full-wave rectifying mode, by using the three-level inverter, dV/dt can be decreased to half the dV/dt of the two-level inverter, and a generation amount of noise and surges becomes equal to a generation amount at the time of operation in the full-wave rectifying mode using the two-level inverter. That is, the generation amount of noise and surges can be suppressed to a greater degree by operating DC power-supply device in the boost mode a (double voltage mode) using the three-level inverter than by operating the DC power-supply device in the boost mode a (double voltage mode) using the two-level inverter. Accordingly, performance improvement of a noise filter, and isolation enhancement of the inductive load (for example, a motor) with respect to surges are not required, and a noise filter and an inductive load equivalent to that at the time of operating the two-level inverter in the full-wave rectifying mode.

In the three-level inverter, dV/dt can be made lower than in the two-level inverter, thereby enabling to make the time change amount (dI/dt) of the current flowing to the inductive load (for example, a motor) lower. Accordingly, high-order frequency components of a motor current can be suppressed to a greater degree, so that iron loss is reduced, and high efficiency can be achieved.

Further, by operating the DC power-supply device in the boost mode a (double voltage mode), the boost mode b, and the boost mode c, when the load is regarded as a constant power load, for example, in the boost mode a (double voltage mode), if a voltage of the supplied power to the load 10 is doubled, then the current is decreased to half. That is, by operating the DC power-supply device in the boost mode a (double voltage mode), the boost mode b and the boost mode c, the current flowing to the load 10 can be decreased as compared to the case of operation in the full-wave rectifying mode, thereby enabling to achieve high efficiency.

Also in the case where the three-level inverter that drives the inductive load is connected as the load 10, as described in the first embodiment, when the DC power-supply device is operated in the boost mode b and the boost mode c, the current amount of a current flowing to the first switching element 4a and the second switching element 4b constituting the charging unit 7 can be decreased by using a switching frequency higher than that in the case where the DC power-supply device is operated in the boost mode a. Accordingly, the allowable current value of the first switching element 4a and the second switching element 4b is not required to increase to a higher value than necessary, and an unnecessary operation of the overcurrent protection circuit can be prevented, thereby enabling to continue the operation of the load 10 stably.

Also in the case where the three-level inverter that drives the inductive load is connected as the load 10, as described in the second embodiment, when any of the first backflow prevention element 5a, the second backflow prevention element 5b, the first switching element 4a and the second switching element 4b has a short-circuit fault, the switch 9 is controlled to be opened and the DC power-supply device is operated in the full-wave rectifying mode. Accordingly, power supply to the load 10 can be stably performed, without causing voltage unbalance between the first capacitor 6a and the second capacitor 6b, such that the voltage of Vdc/2 cannot be outputted, to cause an increase in noise and vibration and an increase in heat generation of the motor. Further, an operation of the motor can be continued without causing stoppage of the motor due to the overcurrent protection function, thereby enabling to acquire a DC power-supply device having high reliability.

Figure 12:
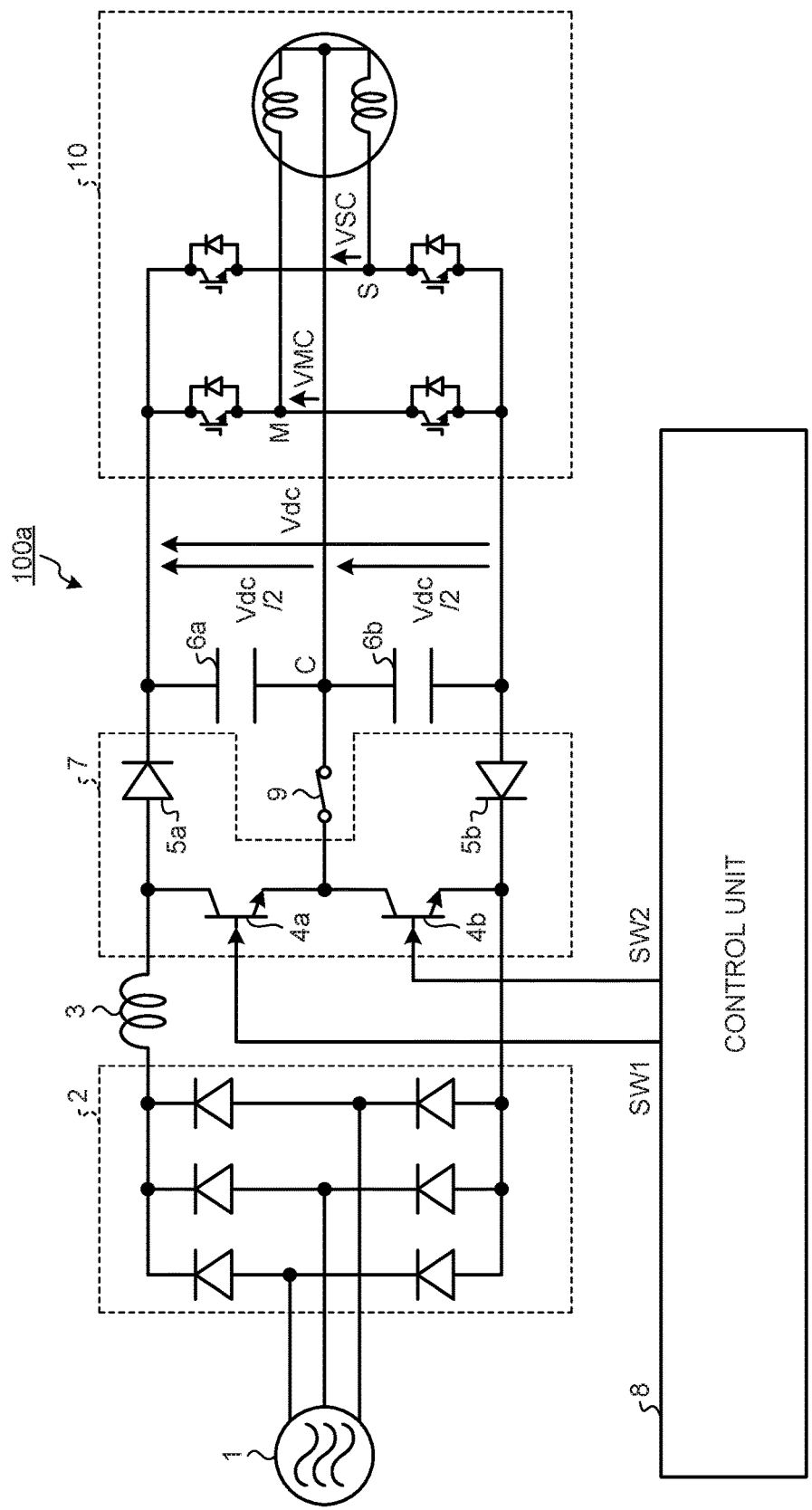
FIG. 12 is a diagram illustrating an example in which an inverter that drives a two-phase motor is connected, as a load of the DC power-supply device.

FIG. 12 is a diagram illustrating an example in which an inverter that drives a two-phase motor is connected as a load of the DC power-supply device. In the example illustrated in FIG. 12, the load 10 is configured to connect a connection point of two coils of the two-phase motor to a neutral point C being a midpoint of a series circuit consisting essentially of the first capacitor 6a and the second capacitor 6b, and connect the other terminals of the two coils to midpoints M and S of two switching arms of the inverter, respectively.

When the two-phase motor is a brushless DC motor having a permanent magnet therein, voltages VMC and VSC applied between M-C and between S-C, respectively, are controlled so that VSC has a leading phase by 90 degrees with respect to VMC.

In the example illustrated in FIG. 12, the voltages of the first capacitor 6a and the second capacitor 6b become respectively Vdc/2 with respect to the voltage Vdc applied to the load 10, whereby control is made such that VSC has a leading phase by 90 degrees with respect to VMC. On the other hand, in the case where any of the first backflow prevention element 5a, the second backflow prevention element 5b, the first switching element 4a and the second switching element 4b has a short-circuit fault or other faults, for example, if the first capacitor 6a is not charged and only the second capacitor 6b is charged to cause voltage unbalance, then VSC may be unable to maintain the leading phase of 90 degrees with respect to VMC and the two-phase motor may not be rotated, by the control based on the condition that the voltages of the first capacitor 6a and the second capacitor 6b become Vdc/2, respectively.

Therefore, also in the case where the inverter that drives the two-phase motor is connected as the load 10, as described in the second embodiment, if any of the first backflow prevention element 5a, the second backflow prevention element 5b, the first switching element 4a and the second switching element 4b has a short-circuit fault, the switch 9 is controlled to be opened, and the DC power-supply device is operated in the full-wave rectifying mode, thereby enabling to prevent occurrence of voltage unbalance between the first capacitor 6a and the second capacitor 6b, although the output voltage becomes lower than the output voltage when the DC power-supply device is operated in the boost mode a (double voltage mode), the boost mode b or the boost mode c. Accordingly, the operation of the two-phase motor can be continued without causing stoppage thereof, thereby enabling to provide a DC power-supply device having high reliability.

Also in the case where the inverter that drives the two-phase motor is connected as the load 10, as described in the first embodiment, when the DC power-supply device is operated in the boost mode b and the boost mode c, the current amount of a current flowing to the first switching element 4a and the second switching element 4b constituting the charging unit 7 can be decreased by using a switching frequency higher than that in the case where the DC power-supply device is operated in the boost mode a. Accordingly, the allowable current value of the first switching element 4a and the second switching element 4b is not required to increase to a higher value than necessary, and an unnecessary operation of the overcurrent protection circuit can be prevented, thereby enabling to continue the operation of the two-phase motor stably.

As described above, according to the DC power-supply device of the third embodiment, even in the case where the three-level inverter that drives the inductive load is connected as the load, similar advantageous effects to those of the first and second embodiments can be acquired, and further, the time change amount (dV/dt) of the inter-line voltage of the inductive load can be made lower than that in a configuration using the two-level inverter. Therefore the generation amount of noise and surges can be suppressed in a greater degree. Furthermore, because the time change amount (dI/dt) of the current flowing to the inductive load (for example, a motor) can be made lower, the high-order frequency components of the current (motor current) flowing in the inductive load can be suppressed, so that iron loss is reduced and high efficiency can be achieved.

Further, by operating the DC power-supply device in the boost mode a (double voltage mode), the boost mode b and the boost mode c, the current flowing to the load 10 can be decreased in a greater degree than that in the case where the DC power-supply device is operated in the full-wave rectifying mode, thereby enabling to achieve high efficiency.

Fourth Embodiment

In the first to third embodiments, a configuration in which the three-phase alternating current is converted into a direct current and the direct current is supplied to the load has been described. In the present embodiment, a configuration in which a single-phase alternating current is converted into a direct current and the direct current is supplied to the load is described.

Figure 13:
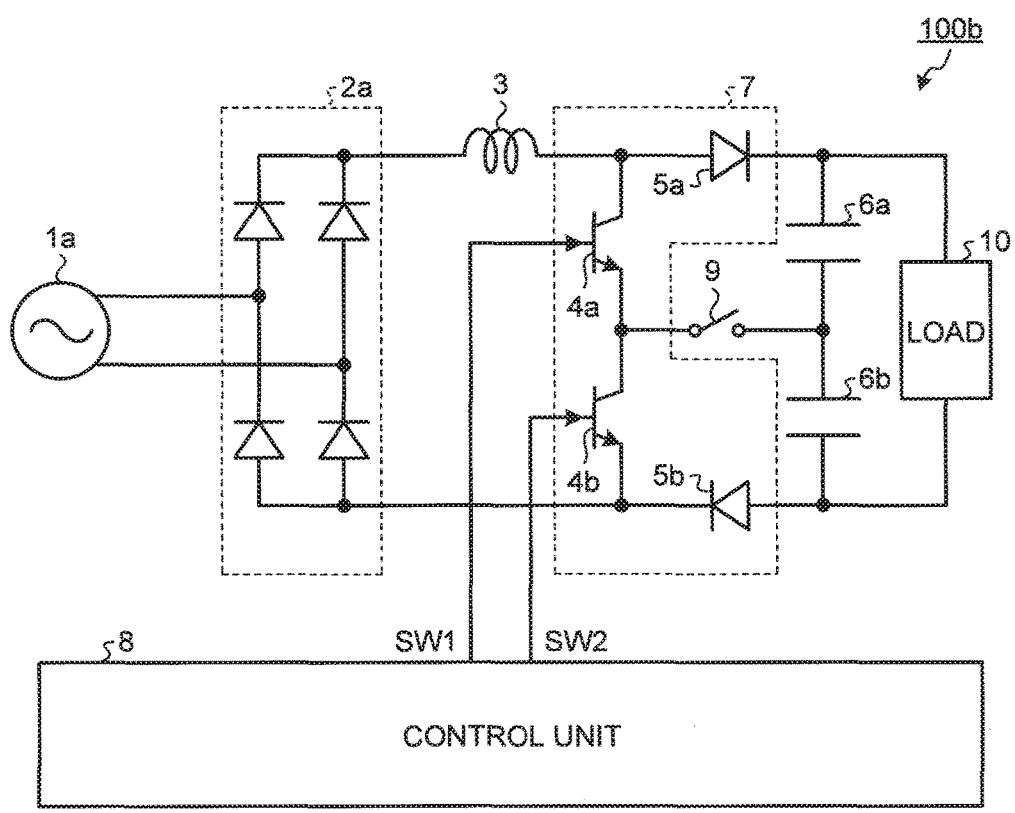
FIG. 13 is a diagram illustrating a configuration example of a DC power-supply device according to a fourth embodiment.

FIG. 13 is a diagram illustrating a configuration example of a DC power-supply device according to a fourth embodiment. As illustrated in FIG. 13, a DC power-supply device 100b according to the fourth embodiment has such a configuration that a single-phase alternating current supplied from an AC power supply 1a is converted into a direct current and the resultant current is supplied to the load 10. In the configuration illustrated in FIG. 13, a rectifier circuit 2a is configured as a single-phase full-wave rectifier circuit in which four rectifier diodes are full-bridge connected. In the example illustrated in FIG. 13, an example in which a reactor 3 is connected to an output side of the rectifier circuit 2a is illustrated. However, a configuration in which the reactor 3 is connected to an input side of the rectifier circuit 2a may be used.

Also in the present embodiment, as with the first embodiment, the operating modes of the DC power-supply device 100b according to the fourth embodiment include a full-wave rectifying mode in which the first switching element 4a and the second switching element 4b are always in an off-controlled state, and a boost mode in which the first switching element 4a and the second switching element 4b are alternately controlled to be on. As the boost mode, there are the boost mode a (double voltage mode) in which an on-duty ratio of the first switching element 4a and the second switching element 4b is 50%, the boost mode b in which the on-duty ratio of the first switching element 4a and the second switching element 4b is less than 50%, and the boost mode c in which the on-duty ratio of the first switching element 4a and the second switching element 4b is larger than 50%. These operating modes are the same as those in the configuration in which the three-phase alternating current is converted into a direct current and the direct current is supplied to the load, which has been described in the first embodiment, and thus descriptions thereof are omitted.

As illustrated in FIG. 13, also in the case where the AC power supply 1a is a single-phase AC power supply, as described in the first embodiment, when the DC power-supply device is operated in the boost mode b and the boost mode c, the DC power-supply device is operated at a switching frequency higher than that when the DC power-supply device is operated in the boost mode a (double voltage mode). By doing so, the current amount of a current flowing to the charging unit 7 can be decreased when the DC power-supply device is operated in the boost mode b and the boost mode c, as with the configuration in which the three-phase alternating current is converted into a direct current and supplied to the load, which has been described in the first embodiment. Accordingly, the allowable current value of the first switching element 4a and the second switching element 4b constituting the charging unit 7 is not required to a higher value than necessary, and an unnecessary operation of the overcurrent protection circuit can be prevented.

In the configuration in which the single-phase alternating current is converted into a direct current and the direct current is supplied to the load, it is desired to execute control such that the switching frequency of the first switching element 4a and the second switching element 4b in the boost mode a is n times the frequency of the single-phase alternating current. In this case, when the DC power-supply device is operated in the boost mode b and the boost mode c, control is executed such that the switching frequency of the first switching element 4a and the second switching element 4b is m times (m>n) the frequency of the single-phase alternating current. By doing so, the waveform of each phase current of the single-phase alternating current has a similar figure in any of the boost modes. Accordingly, unbalance of each phase current does not occur, and a distortion rate of each phase current takes the minimum value, thereby enabling to decrease the current amount of a current flowing to the first switching element 4a and the second switching element 4b, while improving the power factor and suppressing the harmonic current.

For example, by setting the switching frequency of the first switching element 4a and the second switching element 4b to a power supply frequency (for example, 50 Hz or 60 Hz) of the single-phase alternating current or a multiple number thereof in the boost mode a (double voltage mode), or to the least common multiple (300 Hz) of 50 Hz and 60 Hz which are widely used as the power supply frequency of the single-phase alternating current, or a multiple number thereof in the boost mode b and the boost mode c, an operation with the greatest efficiency can be performed without causing an overcurrent shutdown, while suppressing an increase in the switching frequency to the minimum.

Further, also in the case where the AC power supply 1a is a single-phase AC power supply, as described in the second embodiment, when any of the first backflow prevention element 5a, the second backflow prevention element 5b, the first switching element 4a and the second switching element 4b has a short-circuit fault, the switch 9 is controlled to be opened, and the DC power-supply device is operated in the full-wave rectifying mode. Accordingly, even if any of the first backflow prevention element 5a, the second backflow prevention element 5b, the first switching element 4a and the second switching element 4b has a short-circuit fault, power supply to the load 10 can be performed stably, without causing voltage unbalance between the first capacitor 6a and the second capacitor 6b. Further, the operation of the device connected to the DC power-supply device 100b as the load 10 can be continued without causing device stoppage due to the overcurrent protection function.

As described above, according to the DC power-supply device of the fourth embodiment, also in the configuration in which the single-phase alternating current is converted into a direct current and the direct current is supplied to the load, as with the first embodiment, when the DC power-supply device is operated in the boost mode b and the boost mode c, the DC power-supply device is operated at a switching frequency higher than that when the DC power-supply device is operated in the boost mode a (double voltage mode). In this way, the current amount of a current flowing to the charging unit can be decreased when the DC power-supply device is operated in the boost mode b and the boost mode c. Accordingly, the allowable current value of the first switching element and the second switching element is not required to increase to a higher value than necessary, and an unnecessary operation of the overcurrent protection circuit can be prevented.

In addition, the control is made such that the switching frequency in the boost mode a is n times the frequency of the single-phase alternating current, and when the DC power-supply device is operated in the boost mode b and the boost mode c, control is made such that the switching frequency is m times (m>n) the frequency of the single-phase alternating current. Accordingly, the waveform of each phase current of the single-phase alternating current has a similar figure in any of the boost modes, so that unbalance of each phase current does not occur. As a result, a distortion rate of the phase current takes the minimum value, thereby enabling to decrease the current amount of a current flowing to the first switching element 4a and the second switching element 4b, while improving the power factor and suppressing the harmonic current.

Also in the configuration in which the single-phase alternating current is converted into a direct current and the direct current is supplied to the load, as in the second embodiment, when any of the first backflow prevention element, the second backflow prevention element, the first switching element and the second switching element has a short-circuit fault, the switch is controlled to be opened, and the DC power-supply device is operated in the full-wave rectifying mode. By doing so, even if any of the first backflow prevention element, the second backflow prevention element, the first switching element and the second switching element has a short-circuit fault, power supply to the load can be performed stably, without causing voltage unbalance between the first capacitor and the second capacitor. Further, the operation of the device connected to the DC power-supply device as the load can be continued without causing device stoppage due to the overcurrent protection function, thereby enabling to provide a DC power-supply device having higher reliability.

Fifth Embodiment

In this embodiment, description is presented for a refrigeration-cycle application device to which the DC power-supply device 100a described in the second embodiment is applied.

Figure 14:
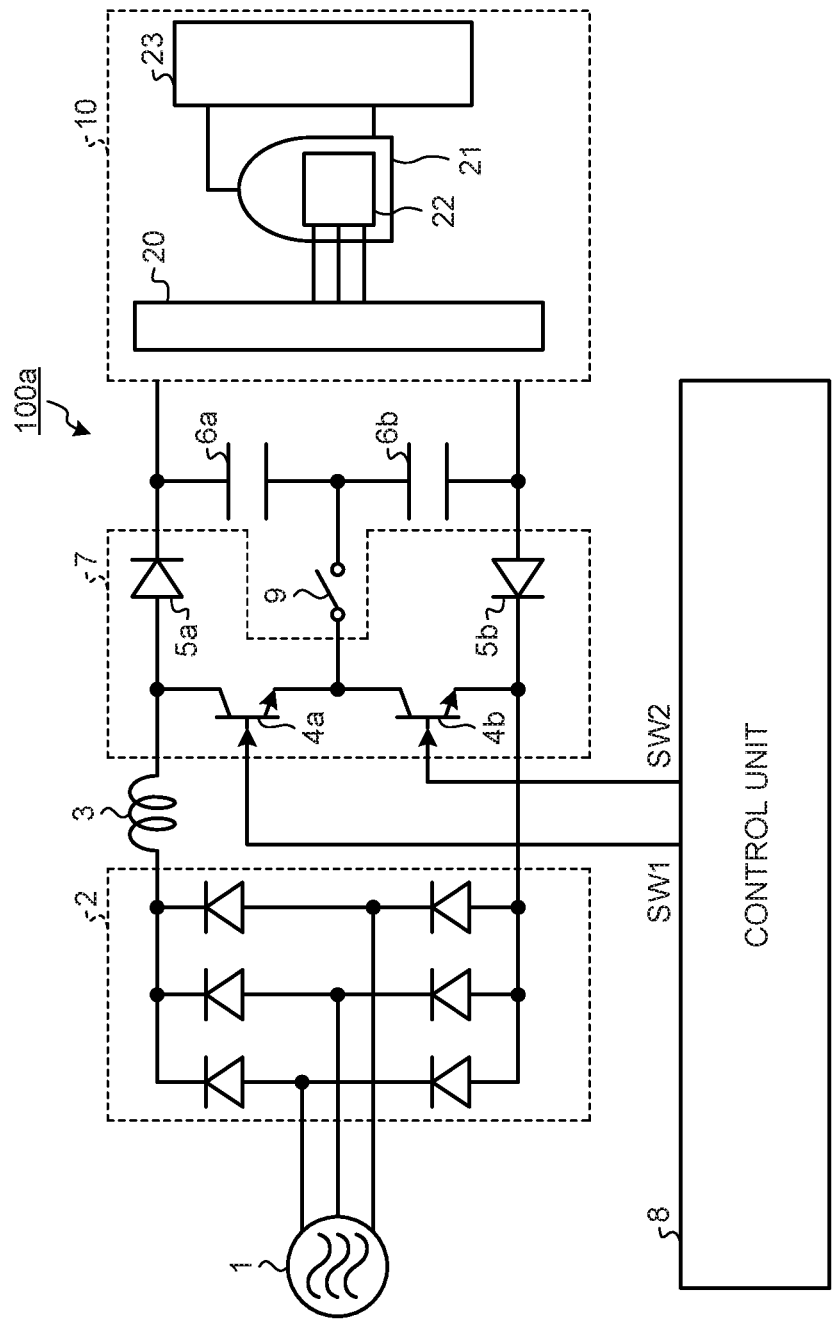
FIG. 14 is a diagram illustrating a configuration example of a refrigeration-cycle application device according to a fifth embodiment.

A more specific configuration of the refrigeration-cycle application device according to the fifth embodiment is described here with reference to FIG. 14.

FIG. 14 is a diagram illustrating a configuration example of a refrigeration-cycle application device according to the fifth embodiment. As the refrigeration-cycle application device according to the fifth embodiment, for example, an air conditioner, a heat-pump water heater, a refrigerator, a freezer, or the like is assumed. In the example illustrated in FIG. 14, such a configuration example is illustrated that a refrigeration air-conditioner configured to include, for example, a three-level inverter that uses a neutral point being a midpoint of the series circuit consisting essentially of the first capacitor 6a and the second capacitor 6b or an inverter 20 for driving a two-phase motor, a compressor 21, a motor 22, and a refrigeration cycle 23 is connected as the load 10 of the DC power-supply device 100a described in the second embodiment with reference to FIG. 6. It is noted that a configurations of the DC power-supply device 100a according to the fifth embodiment is identical to that of the second embodiment, and thus explanations thereof are omitted here.

The inverter 20 is operated based on a DC voltage Vdc supplied from the DC power-supply device 100a and a voltage Vdc/2 at the neutral point thereof, and drives the motor 22 incorporated in the compressor 21 at a variable speed and a variable voltage to cause the compressor 21 to compress a refrigerant in the refrigeration cycle 23 so as to operate the refrigeration cycle 23, thereby performing a desired operation such as refrigerated air conditioning and air heating.

The refrigeration-cycle application device configured as illustrated in FIG. 14 can be blessed with advantageous effects exerted by the DC power-supply devices 100 and 100a described in the first and second embodiments described above.

That is, as described in the first embodiment, when the DC power-supply device is operated in the boost mode b and the boost mode c, the DC power-supply device is operated at a switching frequency higher than that when the DC power-supply device is operated in the boost mode a (double voltage mode). By so doing, the current amount of a current flowing to the charging unit 7 can be decreased when the DC power-supply device is operated in the boost mode b and the boost mode c. Accordingly, the allowable current value of the first switching element 4a and the second switching element 4b constituting the charging unit 7 is not required to increase to a higher value than necessary, and an unnecessary operation of the overcurrent protection circuit can be prevented.

For example, by setting the switching frequency of the first switching element 4a and the second switching element 4b to three times the power supply frequency of the three-phase alternating current (150 Hz when the power supply frequency is 50 Hz) in the boost mode a (double voltage mode), and to a frequency (900 Hz) that is three times the least common multiple of 50 Hz and 60 Hz which are widely used as the power supply frequency of the three-phase alternating current, or other value in the boost mode b and the boost mode c, an operation with the greatest efficiency can be performed without causing an overcurrent shutdown, while suppressing an increase in the switching frequency to the minimum.

Further, as described in the second embodiment, when any of the first backflow prevention element 5a, the second backflow prevention element 5b, the first switching element 4a and the second switching element 4b has a short-circuit fault, the switch 9 is controlled to be opened, and the DC power-supply device is operated in the full-wave rectifying mode. Accordingly, even if any of the first backflow prevention element 5a, the second backflow prevention element 5b, the first switching element 4a and the second switching element 4b has a short-circuit fault, power supply to the inverter 20 can be performed stably, without causing voltage unbalance between the first capacitor 6a and the second capacitor 6b. Further, the operation of the inverter 20 and the motor 22 driven by the inverter 20 can be continued without causing stoppage thereof due to the overcurrent protection function.

Furthermore, not only the aforementioned, but there are other advantageous effects of the refrigeration-cycle application device according to the present embodiment to which the DC power-supply device 100 or 100a according to the first or second embodiment is applied.

Figure 15:
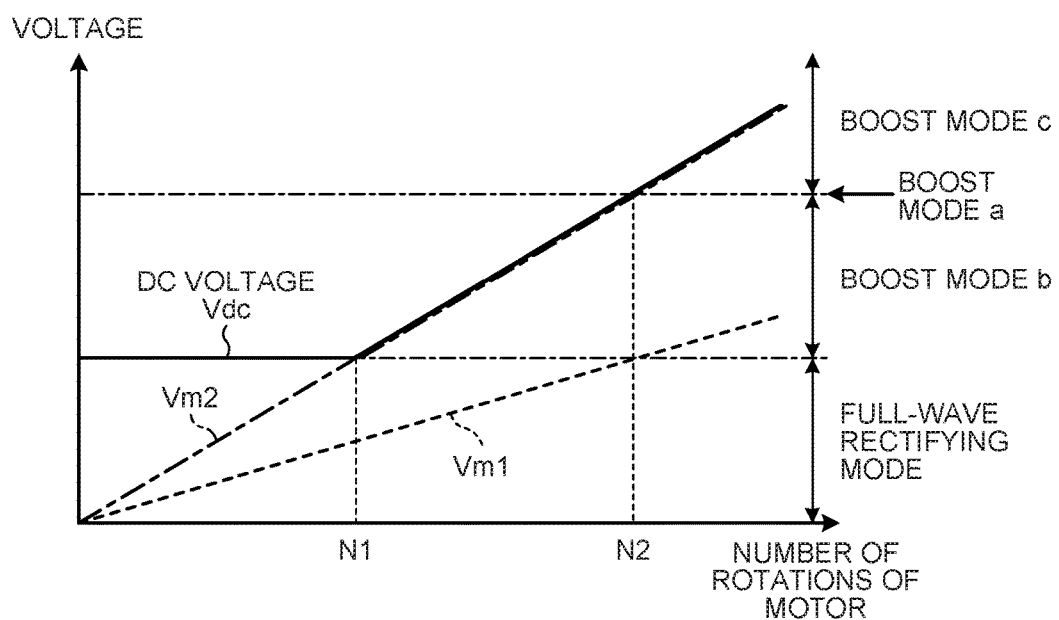
FIG. 15 is a graph representing a relation between the number of rotations of a motor and a direct current voltage Vdc in the refrigeration-cycle application device according to the fifth embodiment.

FIG. 15 is a diagram representing a relation between the number of rotations of a motor and the DC voltage Vdc in the refrigeration-cycle application device according to the fifth embodiment. Generally, when a departure from a target temperature is large, the refrigeration and air-conditioning device raises its own capacity so as to make operation to approximate the target temperature quickly. At this time, the inverter 20 increases the number of rotations of the motor 22 to increase the amount of refrigerant to be compressed by the compressor 21, thereby improving the capacity. A voltage value required for driving the motor 22 increases in proportion to the number of rotations of the motor 22 as illustrated in FIG. 15. In the case of a motor having a low induced voltage, there is shown a characteristic represented by Vm1 (a broken line illustrated in FIG. 15), and in the case of a motor having a high induced voltage, shown a characteristic represented by Vm2 (a one-dot-chain line illustrated in FIG. 15). When the motor having a high induced voltage is used, the motor can be driven with an electric current smaller in a degree corresponding to the increased amount of the voltage supplied from the inverter 20. Consequently, the loss of the inverter 20 decreases, thereby enabling a highly efficient operation. However, when the DC power-supply device is operated in the full-wave rectifying mode, the DC voltage Vdc is low, so that the upper limit of the maximum number of rotations with which a highly efficient operation can be performed is N1, and with the number of rotations exceeding N1, the efficiency deteriorates due to increase in the electric current though an operation is possible by using weaker flux control.

In the DC power-supply device 100 shown in FIG. 14, the DC voltage Vdc can be boosted by switching the operating modes according to an increase in the number of rotations of the motor 22, such that the full-wave rectifying mode is used in a region in which the number of rotations is up to N1, the boost mode b is used in a region from the number of rotations N1 to the number of rotations N2, the boost mode a (double voltage mode) is used at the number of rotations N2, and the boost mode c is used in a region in which the number of rotations is more than the number of rotations N2. Accordingly, the motor 22 can be driven highly efficiently at a high speed. Further, in the region of the number of rotations N1 of greater, the inverter 20 is operated in a state in which a modulation factor is high, by operating the inverter 20 at Vm2≈Vdc. Therefore, because the number of switching pulses due to PWM decreases, high efficiency can be achieved by virtue of reduction of the switching loss of the inverter 20 and reduction of high-frequency iron loss of the motor 22. Further, by operating the DC power-supply device in the boost mode c, a voltage higher than that in the boost mode a (double voltage mode) can be outputted. Accordingly, high efficiency can be achieved by virtue of increase in an induced voltage due to the increased number of turns in a coil of the motor 22.

Further, use of the three-level inverter as the inverter 20 can reduce the time change amount of the inter-line voltage (dV/dt) of the motor 22 in a greater degree than in the configuration using the two-level inverter, thereby enabling to suppress the generation amount of noise and surges. Further, because the time change amount of the current (dI/dt) flowing to the motor 22 can be also made smaller, high-frequency iron loss components of the motor can be suppressed, thereby enabling to improve the motor efficiency, and to achieve high efficiency of the entire refrigeration-cycle application device.

When the DC power-supply device 100a has a fault, and is then operated in the full-wave rectifying mode by controlling the switch 9 to be opened, if the number of revolutions of the motor is large, the current increases and so the efficiency deteriorates though an operation of the device is possible by using weaker flux control. Meanwhile, for example, in a refrigeration-cycle application device requiring high reliability (for example, air conditioner of a server room or a freezing chamber of foods), when the operation is stopped due to a fault, a fault of the device and decomposition of the foods may advance. In the present embodiment, even if the DC power-supply device 100a has a fault, an operation of the device can be continued by the operation in the full-wave rectifying mode, although the efficiency decreases. Accordingly, a refrigeration-cycle application device having high reliability can be realized.

In recent years, studies of transition from a motor using a rare-earth magnet, which is expensive and whose stable supply is difficult, such as neodymium (Nd) and dysprosium (Dy) to a motor without using the rare-earth magnet have been progressing, but there have been problems concerning a decrease in efficiency and a decrease in demagnetization durability. In the DC power-supply device 100 described in the first embodiment, as described above, a decrease in efficiency can be compensated by increasing the number of turns based on boosting. Regarding the decrease in demagnetization durability, the weaker flux control can be suppressed based on boosting, and thus it is possible to use a motor that can be supplied stably and is inexpensive.

Furthermore, as a power-supply voltage of the AC power supply 1 that is a power supply of the DC power-supply device 100, there are various power supply voltages such as 200 volts and 400 volts. Therefore, if the motor 22 is designed in accordance with different power supply conditions for delivery destinations, a plurality of types of motor specification are required, thereby increasing an evaluation burden and a development burden of the motor 22. In the DC power-supply device 100 described in the first embodiment, for example, when the supply voltage of the AC power supply 1 is 200 volts, the DC power-supply device is operated in the boost mode a (double voltage mode), and when the supply voltage of the AC power supply 1 is 400 volts, the DC power-supply device is operated in the full-wave rectifying mode. Thereby, the DC voltage Vdc is invariant between the case where the supply voltage of the AC power supply 1 is 200 volts and the case where the supply voltage of the AC power supply 1 is 400 volts. Consequently, the DC power-supply device can be driven with the same motor specification. Further, also in the case where the supply voltage of the AC power supply 1 is 400 volts, when the DC power-supply device is operated in the full-wave rectifying mode, if the supply voltage is varied, then the DC voltage Vdc is varied. In the circumstances, for example, in the case where the DC voltage Vdc is lower than an assumed value when the DC power-supply device is operated in the full-wave rectifying mode, the DC voltage Vdc is boosted using the boost mode b, thereby enabling to reduce the influence due to the fluctuation of the power-supply voltage, and the inverter 20 can be operated with a fixed voltage.

For example, in the number of rotations N2 of the motor illustrated in FIG. 15, if the switching frequency is changed at the time of changing over the boost mode, the operation may become unstable such that chattering occurs in the switching frequency before and after the changeover of the boost mode. In such a case, what the configuration should take in is to apply hysteresis to the changeover timing of the boost mode, or to change the switching frequency linearly before and after the changeover timing of the boost mode (for example, to increase the switching frequency linearly from 150 Hz to 900 Hz).

As described above, according to the refrigeration-cycle application device of the fifth embodiment, configuration is made using the DC power-supply device shown in the first embodiment described above, whereby the advantageous effects exerted by the DC power-supply device described in the first to fourth embodiments can be achieved.

Furthermore, by switching from the full-wave rectifying mode, next the boost mode b, then the boost mode a (double voltage mode) and the boost mode c according to an increase in the number of rotations of the motor, the motor can be driven highly efficiently at high speed.

Further, high efficiency can be achieved by an increase in an induced voltage based on the increased number of turns in a coil of the motor, thereby enabling to use an inexpensive motor that can be supplied stably.

Because it is possible to cope with different power-supply voltages without changing the motor specification, the evaluation burden and the development burden of the motor can be reduced.

In the embodiments described above, it is generally mainstream to use an Si-based semiconductor made of a silicon (Si) material for the switching element and the backflow prevention element constituting the charging unit for the capacitor, but a wide-bandgap (WBG) semiconductor made of a silicon carbide (SiC), gallium nitride (GaN) or diamond material may be used therefor.

The switching element and the backflow prevention element formed from a WBG semiconductor have high voltage endurance and high allowable current density. Therefore, downsizing of the switching element and the backflow prevention element is possible, and by using such downsized switching element and backflow prevention element, a DC power-supply device configured using these elements can be downsized.

The switching element and the backflow prevention element formed from a WBG semiconductor have high heat resistance. Therefore, downsizing of heat radiating fins of a heatsink and air cooling of a water-cooled unit are possible, thereby enabling further downsizing of the DC power-supply device.

Furthermore, the switching element and the backflow prevention element formed from a WBG semiconductor have a small power loss. Therefore, the switching element and the backflow prevention element can have high efficiency, and thus the DC power-supply device can have high efficiency as well.

While it is desired that both the switching element and the backflow prevention element are formed from a WBG semiconductor, only any one of these elements may be formed from a WBG semiconductor, and even in this case, the effects described above can be achieved.

In the embodiments described above, as the switching element, for example, a power transistor, a power MOSFET, and an IGBT have been mentioned as examples. However, the same effects can be acquired even in the case of using a MOSFET (Metal-Oxide-Semiconductor Field-Effect Transistor) having a super junction structure, which is known as a highly efficient switching element, an insulated gate semiconductor device, a bipolar transistor, or the like.

Furthermore, while the control unit can be configured by a CPU (Central Processing Unit), a DSP (Digital Signal Processor), and/or a discrete system of a microcomputer, the control unit can be also configured otherwise by an electrical circuit element such as an analog circuit or a digital circuit, or the like.

The configurations described in the above embodiments are only examples of a framework of the present invention, so can be combined with other publicly-known techniques, and it is needless to mention that the configurations can be made up while modifying a part thereof such as omitting the part in a scope without departing from the spirit of the present invention.

INDUSTRIAL APPLICABILITY

As described above, the present invention is useful as a technique for suppressing an unnecessary operation of an overcurrent protection circuit associated with a boosting operation, to continue an operation of a device stably, while suppressing a cost increase, in a DC power-supply device having a configuration in which a plurality of capacitors are serially connected between opposite ends of a load, and power is supplied to the load by charging these capacitors. The present invention is particularly suitable for a DC power-supply device having a configuration in which an alternating current is converted into a direct current and the direct current is supplied to a load and for a refrigeration-cycle application device including the DC power-supply device.

The invention claimed is:

1. A DC power-supply device that converts an alternating current into a direct current and supplies the direct current to a load while having a reactor on a conversion path thereof, the DC power-supply device comprising:
    a first capacitor and a second capacitor serially connected between output terminals to the load;
    a charging unit to selectively charge one or both of the first capacitor and the second capacitor; and
    a control unit to control the charging unit to change, based on a ratio of a non-charging period to a period obtained by combining a charging period and the non-charging period when a pair of the first capacitor and the second capacitor is charged, a charging frequency that is an inverse number of the period obtained by combining the charging period and the non-charging period, and thereby to control an output voltage of the load, wherein
    the control unit controls the charging unit such that the charging frequency becomes n times a frequency multiplied by the number of phases of the alternating current (n is a natural number).

2. The DC power-supply device according to claim 1, wherein
    the charging unit includes:
    a first switching element to switch between charging and non-charging of the first capacitor;
    a second switching element to switch between charging and non-charging of the second capacitor;
    a first backflow prevention element to prevent backflow of a charged electric charge of the first capacitor to the first switching element; and
    a second backflow prevention element to prevent backflow of a charged electric charge of the second capacitor to the second switching element.

3. The DC power-supply device according to the claim 2, wherein
    the control unit has
    a full-wave rectifying mode in which the first switching element and the second switching element are in an off-controlled state, and
    a boost mode in which the first switching element and the second switching element are alternately controlled to be on, and
    in the boost mode, the control unit controls an output voltage to the load by changing an on-duty of the first switching element and the second switching element.

4. The DC power-supply device according to the claim 3, wherein in an operating range by the boost mode, the control unit executes control such that the charging frequency in a state having neither a section in which the first switching element and the second switching element are simultaneously off nor a section in which the first switching element and the second switching element are simultaneously on is the lowest, and the charging frequency in an operating range having the section in which the first switching element and the second switching element are simultaneously off and the charging frequency in an operating range having the section in which the first switching element and the second switching element are simultaneously on are made higher.

5. The DC power-supply device according to the claim 3, further comprising
    a switch connected between a midpoint of a series circuit consisting essentially of the first switching element and the second switching element and a midpoint of a series circuit consisting essentially of the first capacitor and the second capacitor, wherein
    when any of the first backflow prevention element, the second backflow prevention element, the first switching element and the second switching element has a short-circuit fault, the control unit controls the switch to be opened, and operates the DC power-supply device in the full-wave rectifying mode.

6. The DC power-supply device according to the claim 5, wherein the switch is an electromagnetic contactor or a semiconductor switching element that does not include a flywheel diode.

7. The DC power-supply device according to claim 2, wherein at least one of the first switching element, the second switching element, the first backflow prevention element and the second backflow prevention element is formed from a wide-bandgap semiconductor.

8. The DC power-supply device according to claim 7, wherein the wide-bandgap semiconductor is silicon carbide, a gallium-nitride-based material, or diamond.

9. The DC power-supply device according to the claim 1, wherein a voltage between opposite ends of a series circuit consisting essentially of the first capacitor and the second capacitor and a voltage at a midpoint of the series circuit are applied to the load.

10. The DC power-supply device according to the claim 9, wherein the load is an inverter configured to have four switching elements that drive a two-phase motor.

11. The DC power-supply device according to the claim 9, wherein the load is a three-level inverter.

12. The DC power-supply device according to the claim 1, wherein the control unit is adapted to a plurality of types of frequencies of the alternating current and controls the charging unit such that the charging frequency becomes a least common multiple of the plurality of types of frequencies of the alternating current.

13. A refrigeration-cycle application device comprising the DC power-supply device according to claim 1.

14. A DC power-supply device that converts an alternating current into a direct current and supplies the direct current to a load while having a reactor on a conversion path thereof, the DC power-supply device comprising:
  a first capacitor and a second capacitor serially connected between output terminals to the load;
  a charging unit to selectively charge one or both of the first capacitor and the second capacitor; and
  a control unit to control the charging unit to change, based on a ratio of a non-charging period to a period obtained by combining a charging period and the non-charging period when a pair of the first capacitor and the second capacitor is charged, a charging frequency that is an inverse number of the period obtained by combining the charging period and the non-charging period, and thereby to control an output voltage of the load, wherein
  a voltage between opposite ends of a series circuit consisting essentially of the first capacitor and the second capacitor and a voltage at a midpoint of the series circuit are applied to the load.

15. The DC power-supply device according to the claim 14, wherein the load is an inverter configured to have four switching elements that drive a two-phase motor.

16. The DC power-supply device according to the claim 14, wherein the load is a three-level inverter.

17. A refrigeration-cycle application device comprising the DC power-supply device according to claim 14.

18. A DC power-supply device that converts an alternating current into a direct current and supplies the direct current to a load while having a reactor on a conversion path thereof, the DC power-supply device comprising:
  a first capacitor and a second capacitor serially connected between output terminals to the load;
  a charging unit to selectively charge one or both of the first capacitor and the second capacitor, the charging unit includes
    a first switching element to switch between charging and non-charging of the first capacitor,
    a second switching element to switch between charging and non-charging of the second capacitor,
    a first backflow prevention element to prevent backflow of a charged electric charge of the first capacitor to the first switching element, and
    a second backflow prevention element to prevent backflow of a charged electric charge of the second capacitor to the second switching element; and
  a control unit to control the charging unit to change, based on a ratio of a non-charging period to a period obtained by combining a charging period and the non-charging period when a pair of the first capacitor and the second capacitor is charged, a charging frequency that is an inverse number of the period obtained by combining the charging period and the non-charging period, and thereby to control an output voltage of the load, wherein the control unit has
    a full-wave rectifying mode in which the first switching element and the second switching element are in an off-controlled state, and
    a boost mode in which the first switching element and the second switching element are alternately controlled to be on, and
    in the boost mode, the control unit controls an output voltage to the load by changing an on-duty of the first switching element and the second switching element, and
    in an operating range by the boost mode, the control unit executes control such that the charging frequency in a state having neither a section in which the first switching element and the second switching element are simultaneously off nor a section in which the first switching element and the second switching element are simultaneously on is the lowest, and the charging frequency in an operating range having the section in which the first switching element and the second switching element are simultaneously off and the charging frequency in an operating range having the section in which the first switching element and the second switching element are simultaneously on are made higher.

19. A refrigeration-cycle application device comprising the DC power-supply device according to claim 18.

* * * * *